US012784520B2

(12) United States Patent
Imanishi et al.

(10) Patent No.: US 12,784,520 B2

(45) Date of Patent: Nov. 3, 2026

(54) VEHICLE DATA COLLECTION DEVICE AND VEHICLE DATA COLLECTION SYSTEM

(71) Applicant: HITACHI ASTEMO, LTD., Ibaraki (JP)

(72) Inventors: Yuto Imanishi, Tokyo (JP); Ryosuke Ishida, Ibaraki (JP); Yoshiyuki Yoshida, Ibaraki (JP); Koji Maeda, Ibaraki (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 0 days.

(21) Appl. No.: 19/114,915

(22) PCT Filed: Aug. 9, 2023

(86) PCT No.: PCT/JP2023/029190

§ 371 (c)(1),
(2) Date: Mar. 25, 2025

(87) PCT Pub. No.: WO2024/105946

PCT Pub. Date: May 23, 2024

(65) Prior Publication Data

US 2026/0141755 A1 May 21, 2026

(30) Foreign Application Priority Data

Nov. 14, 2022 (JP) ................................ 2022-182106

(51) Int. Cl.
*G07C 5/00* (2006.01)
*G07C 5/08* (2006.01)

(52) U.S. Cl.
CPC ............ *G07C 5/085* (2013.01); *G07C 5/008* (2013.01)

(58) Field of Classification Search
CPC .......... G07C 5/085; G07C 5/008; G07C 5/00
(Continued)

(56) References Cited

U.S. PATENT DOCUMENTS

2017/0330391 A1 11/2017 Uno
2018/0286152 A1 10/2018 Iwaasa
(Continued)

FOREIGN PATENT DOCUMENTS

JP 2016132368 A 7/2016
JP 2017-97556 A 6/2017
(Continued)

OTHER PUBLICATIONS

Japanese Office Action received in corresponding Japanese Application No. 2022-182106 dated Dec. 2, 2025.
(Continued)

*Primary Examiner* — Shardul D Patel
(74) *Attorney, Agent, or Firm* — MATTINGLY & MALUR, PC

(57) ABSTRACT

A vehicle data collection device includes a setting unit which determines a collection setting that is setting information for each ECU corresponding to a collection request; a collection condition determination unit which sets a collection condition based on the collection setting, and determines whether the collection condition is satisfied; a collected data output unit which sets collected data based on the collection setting, and acquires the collected data from each ECU; a multi-stage holding unit which holds collected data output before the collection condition is satisfied and collected data output after the collection condition is satisfied based on the collection setting; a transmission standby unit which keeps the held collected data in a standby state for transmission; and a transmission unit which transmits the
(Continued)

collected data kept in the standby state by the transmission standby unit to a request source.

15 Claims, 25 Drawing Sheets

(58) Field of Classification Search
USPC .......................................................... 701/33.4
See application file for complete search history.

(56) References Cited

U.S. PATENT DOCUMENTS

| | | | | |
|---|---|---|---|---|
| 2021/0405994 | A1 | 12/2021 | Takatsuna | |
| 2022/0217298 | A1* | 7/2022 | Kasuya ................ | H04N 9/8205 |
| 2023/0063930 | A1 | 3/2023 | Ichida et al. | |

FOREIGN PATENT DOCUMENTS

| | | | |
|---|---|---|---|
| JP | 2019-168921 | A | 10/2019 |
| JP | 2021-174413 | A | 11/2021 |
| JP | 2021176090 | A | 11/2021 |
| JP | 2022007618 | A | 1/2022 |
| JP | 7156091 | B2 | 10/2022 |

OTHER PUBLICATIONS

International Search Report of PCT/JP2023/029190 dated Oct. 24, 2023.
Extended European Search Report received in corresponding European Application No. 23891106.9 dated Sep. 23, 2026.

* cited by examiner

FIG. 11
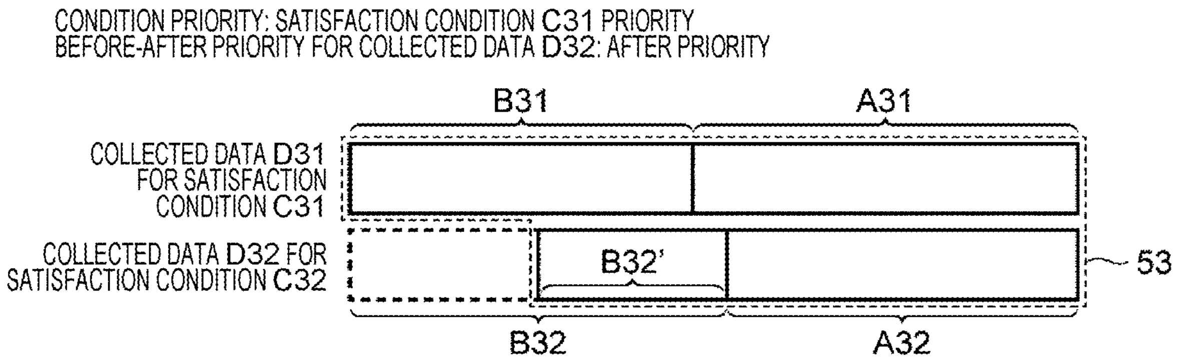
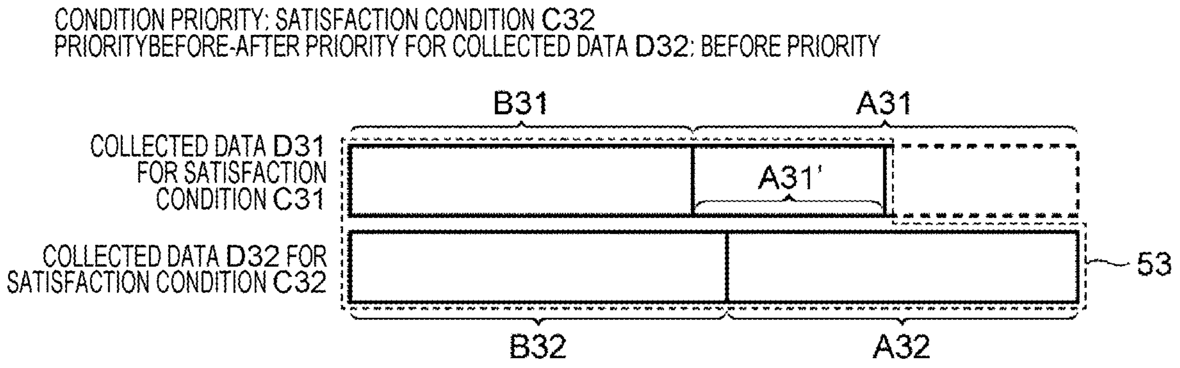

FIG. 12

CONDITION PRIORITY: SATISFACTION CONDITION C31 PRIORITY
BEFORE-AFTER PRIORITY FOR COLLECTED DATA D32: AFTER PRIORITY
FORMAT PRIORITY FOR COLLECTED DATA D32: FORMAT NON-MAINTENANCE PRIORITY

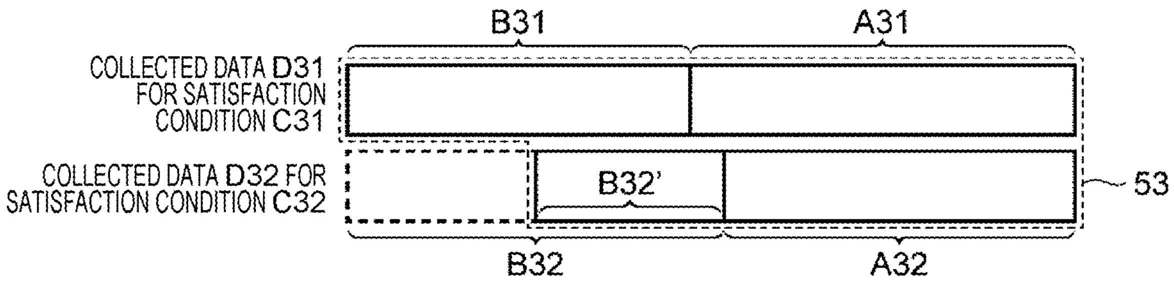

CONDITION PRIORITY: SATISFACTION CONDITION C31 PRIORITY
BEFORE-AFTER PRIORITY FOR COLLECTED DATA D32: AFTER PRIORITY
FORMAT PRIORITY FOR COLLECTED DATA D32: FORMAT MAINTENANCE PRIORITY

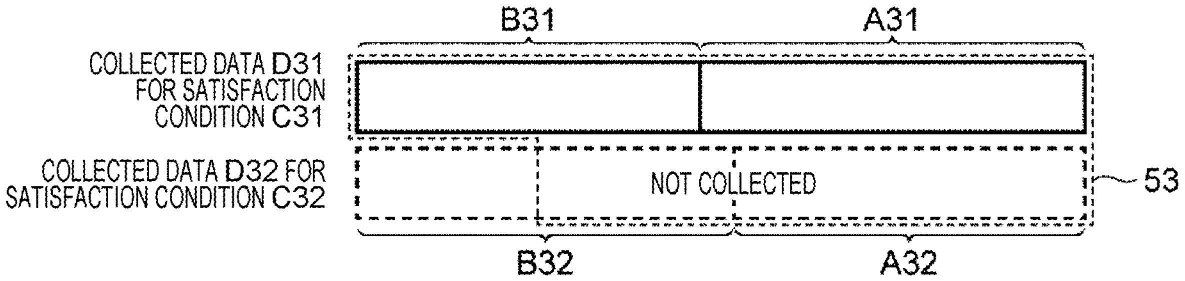

VEHICLE DATA COLLECTION DEVICE AND VEHICLE DATA COLLECTION SYSTEM

TECHNICAL FIELD

The present invention relates to a vehicle data collection device and a vehicle data collection system.

BACKGROUND ART

In recent years, a vehicle data collection device that collects data from a vehicle after being sold and transmits the data to a server device provided outside the vehicle has been developed. In response to a request from the server device, the vehicle data collection device collects vehicle data such as control signals inside any electronic control unit (hereinafter also referred to as "ECU") mounted on the vehicle or control signals exchanged between ECUs during traveling or the like. Then, the vehicle data collection device transmits the collected vehicle data to the server device via a mobile phone communication network or the like.

The server device collects vehicle data from a large number of vehicles and uses the vehicle data for various applications. For example, the server device collects sensor data from an automatic driving vehicle when a near miss occurs, so that the collected sensor data can be used for learning of artificial intelligence (AI). In addition, the server device collects input/output data of software, so that the collected sensor data can be used for verifying the software.

PTL 1 discloses an example of a vehicle data collection system. A server device of the system disclosed in PTL 1 determines a vehicle data collection condition, and requests an ECU from which data is to be collected to transmit target collected vehicle data when it is detected that the collection condition is satisfied.

CITATION LIST

Patent Literature

PTL 1: JP 2016-132368 A

SUMMARY OF INVENTION

Technical Problem

However, in the system disclosed in PTL 1, since the transmission of the vehicle data is requested after the satisfaction of the collection condition is detected, vehicle data obtained before the satisfaction of the collection condition cannot be collected. For example, in a case where it is desired to collect vehicle data from an automatic driving vehicle in which a near miss has occurred for learning of AI in order to suppress the occurrence of near misses, it is important to collect vehicle data obtained in the process up to the occurrence of the near miss as well as the vehicle data obtained after the occurrence of the near miss. The system disclosed in PTL 1 cannot collect vehicle data obtained before the collection condition is satisfied, and thus cannot collect vehicle data obtained in the process until a near miss occurs.

In order to collect vehicle data before the collection condition is satisfied, it is necessary to accumulate the vehicle data before the collection condition is satisfied. For example, in a case where a non-volatile memory is provided in any ECU in order to accumulate vehicle data before the collection condition is satisfied, it is necessary to frequently transmit vehicle data from an ECU that is a source from which the vehicle data is output to the ECU provided with the non-volatile memory, constraining communication. In addition, for example, in a case where non-volatile memories are provided in the respective ECUs, communication constraints between the ECUs are avoided. However, an ECU that is a source from which vehicle data is output is not determined until a request from the server device is received, and it is necessary to provide non-volatile memories for all ECUs any of which can be an output source, causing cost increases. In addition, in a case where a volatile memory included in each ECU is used to accumulate vehicle data, since the capacity of the volatile memory that can be allocated for accumulation differs from vehicle to vehicle, it is necessary to give up a collection method that cannot be adopted by a vehicle having a small capacity for collection, or it is necessary to give up collection from a vehicle having a small capacity, making it difficult to flexibly collect vehicle data.

The present invention has been made in view of the above, and an object of the present invention is to flexibly collect vehicle data before and after a vehicle data collection condition is satisfied while suppressing communication constraints and cost increases.

Solution to Problem

In order to solve the aforementioned problem, a vehicle data collection device according to the present invention is a vehicle data collection device that collects vehicle data from an electronic control device in response to a vehicle data collection request, the vehicle data collection device including: a setting unit which determines a collection setting that is setting information for the electronic control device corresponding to the collection request; a collection condition determination unit which sets a vehicle data collection condition based on the collection setting, and determines whether the set collection condition is satisfied; a collected data output unit which sets collected data that is the vehicle data to be collected based on the collection setting, acquires the set collected data from the electronic control device, and outputs the acquired collected data; a multi-stage holding unit which holds the collected data output before the collection condition is satisfied and the collected data output after the collection condition is satisfied based on the collection setting; a transmission standby unit which keeps the collected data held in the multi-stage holding unit in a standby state for transmission to a collection request source; and a transmission unit which transmits the collected data kept in the standby state by the transmission standby unit to the request source, in which the collection request includes a set value related to the number of pieces of collected data held in the multi-stage holding unit, and the setting unit determines the collection setting by changing the number of pieces of collected data held in the multi-stage holding unit from the set value.

Advantageous Effects of Invention

According to the present invention, it is possible to flexibly collect vehicle data before and after a vehicle data collection condition is satisfied while suppressing communication constraints and cost increases.

Other problems, configurations, and effects that are not described above will be apparent from the following description of embodiments.

BRIEF DESCRIPTION OF DRAWINGS

FIG. 11 is a diagram for explaining an operation of the multi-stage holding unit in a case where the setting unit illustrated in FIG. 3 determines a collection setting based on a condition priority.

FIG. 12 is a diagram for explaining an operation of the multi-stage holding unit in a case where the setting unit illustrated: n FIG. 3 determines a collection setting based on a format priority.

DESCRIPTION OF EMBODIMENTS

Hereinafter, embodiments of the present invention will be described with reference to the drawings. Note that components denoted by the same reference signs between the embodiments have the same functions between the embodiments, and the description thereof will be omitted unless otherwise specified.

In each embodiment to be described below, a case where the present invention is applied to a control unit (ECU) mounted on an electric vehicle having an automatic driving function will be described as an example. However, the present invention can also be applied to a control unit (ECU) mounted on any type of vehicle such as an electric vehicle, a hybrid vehicle, an engine vehicle, or a construction vehicle traveling on a construction site, which does not have an automatic driving function.

First Embodiment

A vehicle data collection device 5 according to a first embodiment will be described with reference to FIGS. 1 to 15.

Figure 1:
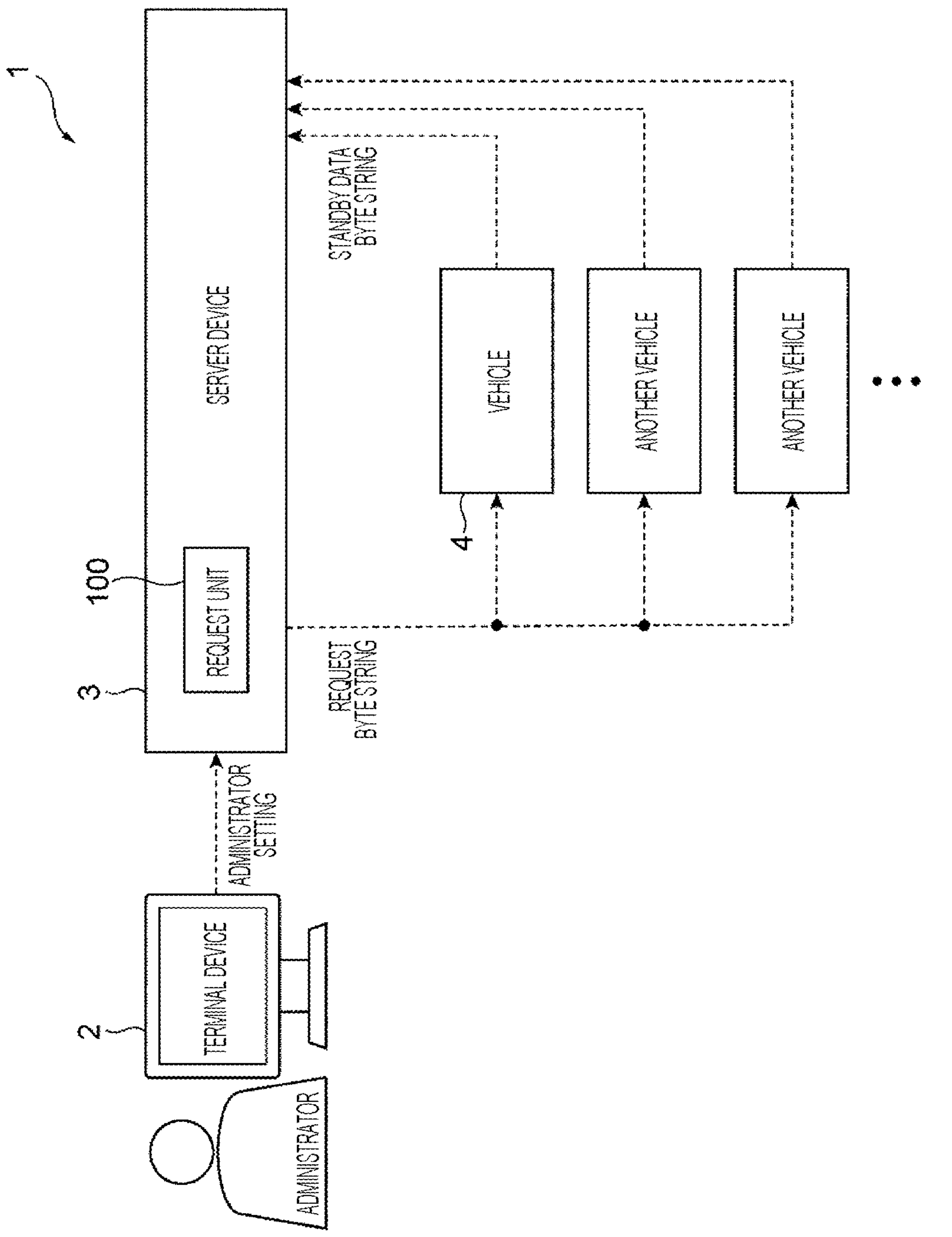
FIG. 1 is a diagram illustrating a schematic configuration of a vehicle data collection system including a vehicle data collection device according to a first embodiment.

FIG. 1 is a diagram illustrating a schematic configuration of a vehicle data collection system 1 including the vehicle data collection device 5 according to the first embodiment. A broken line arrow illustrated in FIG. 1 indicates a flow of a signal or data.

The vehicle data collection system 1 includes a terminal device 2 to which an administrator inputs an administrator setting, a server device 3 connected to the terminal device 2 for wired or wireless communication, and a vehicle 4 connected to the server device 3 via a wireless communication network such as a mobile phone communication network.

The terminal device 2 includes a user interface such as a display and a keyboard. The administrator can input an administrator setting to the terminal device 2 via a graphical user interface (GUI). The administrator setting is a vehicle data collection setting input by the administrator, and includes a range of vehicles for which collection of vehicle data is attempted and a request to be transmitted to each vehicle. The terminal device 2 transmits the input administrator setting to the server device 3.

The server device 3 includes a central processing unit (CPU), a dynamic random access memory (DRAM), a hard disk drive, a network adapter, and the like, and the CPU executes a server program to implement various functions of the server device 3.

The server device 3 includes a request unit 100 that generates a vehicle data collection request based on the administrator setting transmitted from the terminal device 2, and transmits the generated collection request to the vehicle 4. Specifically, the request unit 100 serializes the request included in the administrator setting transmitted from the terminal device 2, and calculates a request byte string. Further, the request unit 100 selects a plurality of vehicles including the vehicle 4 based on the range included in the administrator setting, and transmits the request byte string via the mobile phone communication network. As a result, the server device 3 can transmit, to the vehicle 4, the vehicle data collection: request corresponding to the request included in the administrator setting for the plurality of vehicles corresponding to the range included in the administrator setting.

The range included in the administrator setting may be a range defined by the vehicle type. This enables the server device 3 to transmit the vehicle data collection request only to vehicles 4 of specific vehicle type. The range included in the administrator setting may be a range defined by the vehicle class. This enables the server device 3 to transmit the vehicle data collection request only to vehicles 4 of specific vehicle class. The range included in the administrator setting may be a range defined by the area where vehicles 4 are present. This enables the server device 3 to transmit the vehicle data collection request only to vehicles 4 that are present in a specific area such as a specific city, town, or village, a specific road, or a specific intersection. The range included in the administrator setting may be a range defined by the list of vehicle registration numbers. This enables the server device 3 to transmit the vehicle data collection request only to vehicles 4 with specific vehicle registration numbers.

The vehicle 4 collects vehicle data from an ECU mounted on the vehicle 4 in response to the request from the server device 3. The collected vehicle data temporarily stands by in the vehicle 4 until communication between the vehicle 4 and the server device 3 is established, is then serialized and converted into a standby data byte string. The standby data byte string is transmitted to the server device 3 via the mobile phone communication network. This enables the server device 3 to collect vehicle data.

Figure 2:
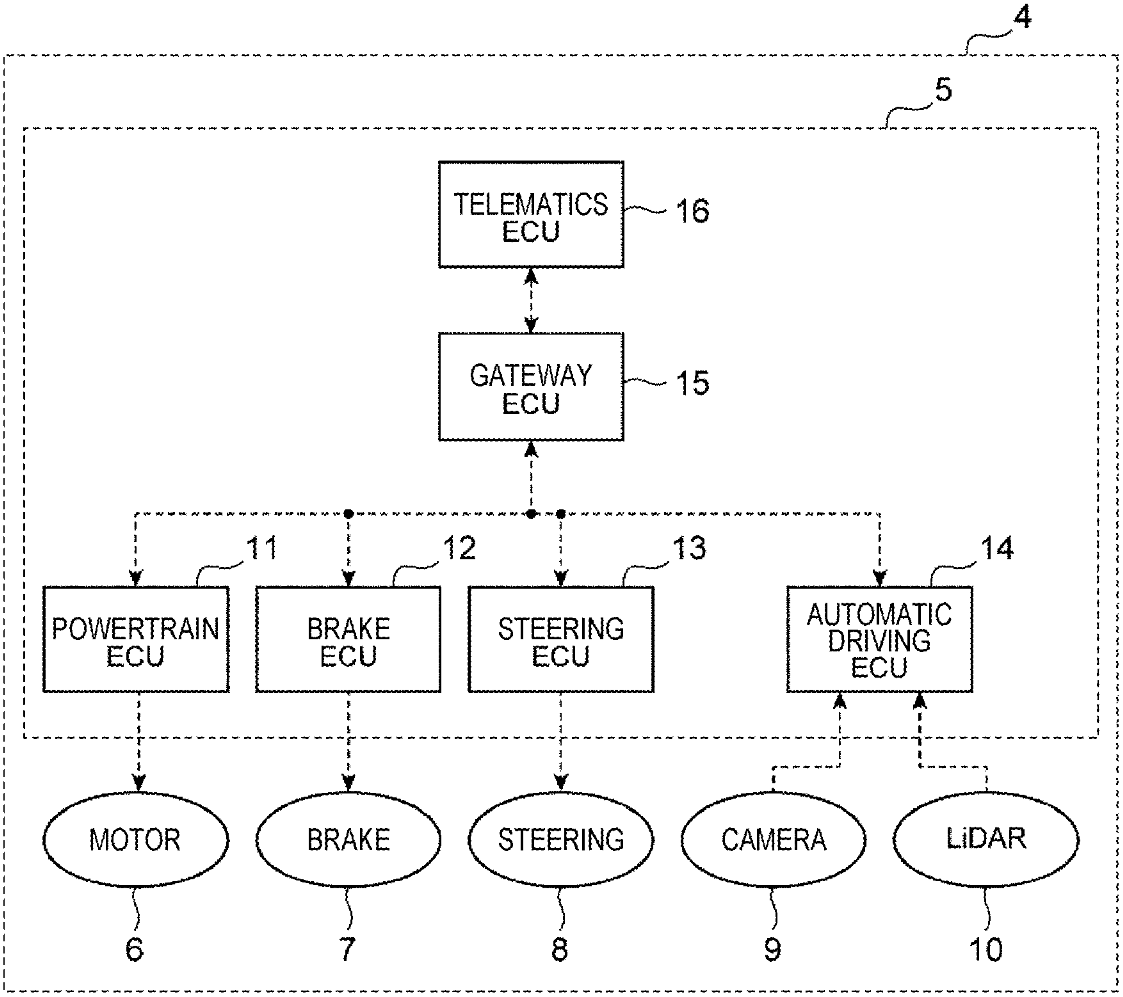
FIG. 2 is a diagram illustrating a schematic configuration of a vehicle illustrated in FIG. 1.

FIG. 2 is a diagram illustrating a schematic configuration of the vehicle 4 illustrated in FIG. 1. A broken line arrow illustrated in FIG. 2 indicates a flow of a signal or data.

The vehicle 4 includes a motor 6 that drives the vehicle 4, a brake 7 that brakes the vehicle 4, a steering 8 that steers the vehicle 4, a camera 9 that captures an image in front of the vehicle 4, a light detection and ranging 10 (LiDAR 10) that measures the periphery of the vehicle 4, a power train ECU 11 that commands the motor 6 to operate, a brake ECU 12 that commands the brake 7 to operate, a steering ECU 13 that commands the steering 8 to operate, an automatic driving ECU 14 that calculates an automatic driving command value of the vehicle 4, a gateway ECU 15 that prevents unauthorized intrusion from the outside of the vehicle, and a telematics ECU 16 that communicates with the outside of the vehicle. Further, the vehicle 4 includes a vehicle data collection device 5 that collects vehicle data from the ECU in response to a vehicle data collection request from the server device 3.

The motor 6 converts electric energy supplied to the motor 6 into kinetic energy to generate power. The generated power is transmitted to driving wheels after being decelerated by a decelerator, and becomes a driving force for driving the vehicle 4. The brake 7 generates a frictional force by pressing a brake pad against a disk rotor rotating together with the wheels. This enables the kinetic energy of the rotating wheels to be converted into thermal energy, thereby braking the vehicle 4. The steering 8 can steer the vehicle 4 by changing the angle of the driving wheels and changing the traveling direction. The camera 9 can capture an image in front of the vehicle 4 by converting the intensity of light incident on the imaging element into electric charges, and output image data. The LiDAR 10 can measure a distance to the periphery of the vehicle 4 by irradiating the periphery of the vehicle 4 with laser and detecting reflected light, and output a measurement result as point cloud data.

The powertrain ECU 11 includes a CPU, a DRAM, and the like, and calculates a command value to be transmitted to the motor 6 by the CPU executing a powertrain control program. The brake ECU 12 includes a CPU, a DRAM, and the like, and calculates a command value to be transmitted to the brake 7 by the CPU executing a brake control program. The steering ECU 13 includes a CPU, a DRAM, and the like, and calculates a command value to be transmitted to the steering 8 by the CPU executing a steering control program. This enables the vehicle 4 to control its traveling, such as acceleration/deceleration and turning of the vehicle 4.

The automatic driving ECU 14 includes a CPU, a DRAM, a flash memory, and the like, and calculates an automatic driving command value by the CPU executing an automatic driving control program. At this time, the automatic driving ECU 14 calculates an automatic driving command value based on the image data transmitted from the camera 9 or the point cloud data transmitted from the LiDAR 10. Further, as the CPU executes the automatic driving control program, the automatic driving ECU 14 transmits the calculated automatic driving command value to the power train ECU 11, the brake ECU 12, and the steering ECU 13. This enables the vehicle 4 to automatically drive.

The gateway ECU 15 includes a CPU, a DRAM, and the like, and monitors communication with the outside of the vehicle and prevents unauthorized intrusion from the outside of the vehicle by the CPU executing a gateway control program. The telematics ECU 16 includes a CPU, a DRAM, a communication antenna, and the like, and can communicate with the server device 3 via the mobile phone communication network by the CPU executing a communication program.

Figure 3:
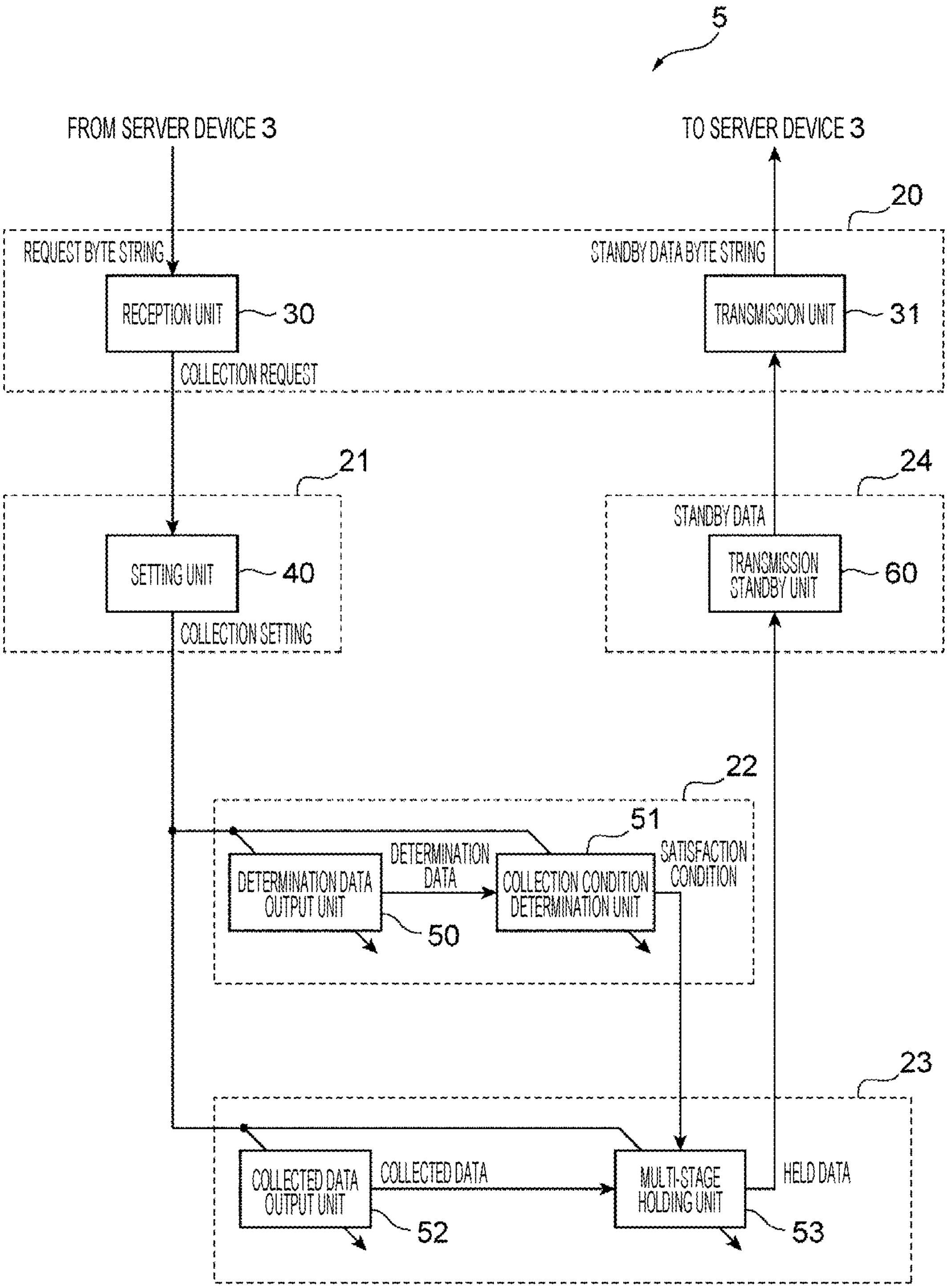
FIG. 3 is a diagram illustrating a functional configuration of the vehicle data collection device illustrated in FIG. 2.

FIG. 3 is a diagram illustrating a functional configuration of the vehicle data collection device 5 illustrated in FIG. 2.

The vehicle data collection device 5 5 includes a communication function 20 that communicates with the source from which collection of vehicle data is requested (the server device 3 in the present embodiment), a setting function 21 that performs a setting related to collection of vehicle data for each ECU, and a determination function 22 that determines whether a vehicle data collection condition is satisfied. The vehicle data collection device 5 further includes a collection function 23 that collects vehicle data, and a standby function 24 that keeps the vehicle data collected by the collection function 23 (hereinafter also referred to as "collected data") in a standby state for transmission to the server device 3.

The functions 20 to 24 of the vehicle data collection device 5 are implemented by the ECUs. The functions 20 to 24 of the vehicle data collection device 5 are configured by hardware and software f the ECUs. For example, the communication function 20 is implemented by the telematics ECU 16. The communication function 20 is constituted by the CPU, the memory, and the communication program included in the telematics ECU 16. For example, the setting function 21 is implemented by the gateway ECU 15. The setting function 21 is constituted by the CPU, the memory, and the setting program included in the gateway ECU 15. For example, the determination function 22 is implemented by the power train ECU 11, the brake ECU 12, the steering ECU 13, the automatic driving ECU 14, or the gateway ECU 15. The determination function 22 is constituted by the CPU, the memory, and the determination program included in the power train ECU 11, the brake ECU 12, the steering ECU 13, the automatic driving ECU 14, or the gateway ECU 15. For example, the collection function 23 is implemented by the power train ECU 11, the brake ECU 12, the steering ECU 13, the automatic driving ECU 14, or the gateway ECU 15. The collection function 23 is constituted by the CPU, the memory, and the collection program included in the power train ECU 11, the brake ECU 12, the steering ECU 13, the automatic driving ECU 14, or the gateway ECU 15. The standby function 24 is implemented by the automatic driving ECU 14. The standby function 24 is constituted by the CPU, the memory, and the standby program included in the automatic driving ECU 14. The functions 20 to 24 of the vehicle data collection device 5 are realized by the CPUs of the respective ECUs executing the programs constituting the respective functions 20 to 24. The CPUs of the respective ECUs execute the programs constituting the functions 20 to 24 in parallel with control programs of the respective ECUs.

The communication function 20 includes a reception unit 30 that receives a collection request from the server device 3 that is a source from which vehicle data is requested. Furthermore, the communication function 20 includes a transmission unit 31 that transmits collected vehicle data (collected data) to the server device 3 that is a request source. The communication function 20 will be described in detail below with reference to FIG. 4.

The setting function 21 includes a setting unit 40 that determines a collection setting corresponding to each ECU based on the vehicle data collection request received by the reception unit 30.

The collection setting is information on a setting related to collection of vehicle data for each ECU. The collection setting is information on a setting according to the received collection request for each ECU. Specifically, the collection setting is information on a setting obtained by changing the content of the received collection request according to each ECU so that each ECU can execute the collection program of the collection function 23 based on the specification of each of the ECUs (that is, the powertrain ECU 11, the brake ECU 12, the steering ECU 13, the automatic driving ECU 14, and the gateway ECU 15) constituting the collection function 23. The collection request includes a set value related to the number of pieces of collected data held in a multi-stage holding unit 53. The setting unit 40 can determine the collection setting by changing the number of pieces of collected data held in the multi-stage holding unit 53 from the set value included in the collection request. The setting function 21 will be described in detail below with reference to FIG. 5.

The determination function 22 includes a collection condition determination unit 51 that sets a vehicle data collection condition based on the collection setting determined by the setting unit 40, and determines whether the set collection condition is satisfied. Further, the determination function 22 includes a determination data output unit 50 that sets vehicle data to be determined when the collection condition determination unit 51 determines whether the collection condition is satisfied as determination data based on the collection setting, and acquires the set determination data from the ECU and outputs the determination data.

The collection condition determination unit 51 determines whether the determination data output by the determination data output unit 50 satisfies the set collection condition. When it is determined that the collection condition is satisfied, the collection condition determination unit 51 transmits a satisfaction condition indicating the satisfied collection condition to the multi-stage holding unit 53. The determination function 22 will be described in detail below with reference to FIG. 6.

The collection function 23 includes a collected data output unit 52 that sets vehicle data to be collected as collected data based on the collection setting determined by the setting unit 40, and acquires and outputs the set collected data from the ECU. Furthermore, the collection function 23 includes a multi-stage holding unit 53 that holds collected data output before the collection condition is satisfied and collected data output after the collection condition is satisfied based on the collection setting.

The multi-stage holding unit 53 is constituted by the memory and a part of the collection program included in the ECU constituting the collection function 23. The memory constituting the multi-stage holding unit 53 is a volatile memory, for example, a ring buffer. Based on the collection setting set by the setting unit 40 and the satisfaction condition transmitted from the collection condition determination unit 51, the multi-stage holding unit 53 deletes the held collected data from the oldest one in chronological order at every predetermined operation cycle, and sequentially holds the collected data output from the collected data output unit 52. In this manner, the multi-stage holding unit 53 updates the collected data held in the memory constituting the multi-stage holding unit 53 (hereinafter also referred to as "held data") at every operation cycle. In addition, when a predetermined number of operation cycles have elapsed after the satisfaction condition is received (that is, after the collection condition is satisfied), the multi-stage holding unit 53 stops updating the held data and transmits the held data of the multi-stage holding unit 53 to a transmission standby unit 60. The collection function 23 will be described in detail below with reference to FIG. 7.

The standby function 24 includes a transmission standby unit 60 that keeps the collected data in a standby state for transmission to the source from which the collected data is requested. The transmission standby unit 60 is constituted by the memory and the standby program included in the ECU constituting the standby function 24. The memory constituting the transmission standby unit 60 is a non-volatile memory, for example, a flash memory. The transmission standby unit 60 stores the held data transmitted from the multi-stage holding unit 53 in the memory constituting the transmission standby unit 60, and keeps the held data in a standby state until communication between the server device 3, which is a request source, and the vehicle 4 is established. When the communication between the server device 3 and the vehicle 4 is established, the held data stored in the memory constituting the transmission standby unit 60 (hereinafter also referred to as "standby data") is transmitted to the server device 3, which is a request source, by the transmission unit 31. The standby function 24 will be described in detail below with reference to FIG. 8.

Figure 4:
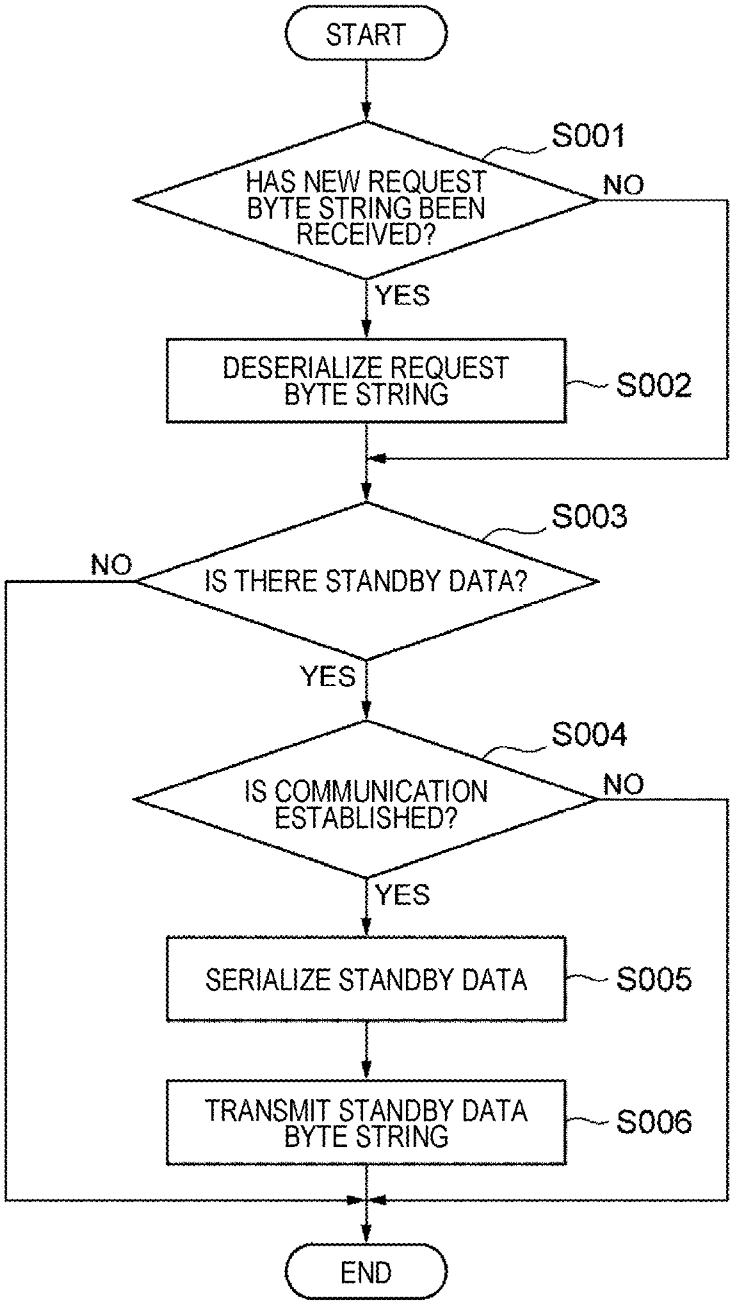
FIG. 4 is a flowchart of a communication program constituting a communication function illustrated in FIG. 3.

FIG. 4 is a flowchart of the communication program constituting the communication function 20 illustrated in FIG. 3. The CPU of the ECU constituting the communication function 20 repeatedly executes the communication program illustrated in FIG. 4 at every predetermined operation cycle while the power supply of the vehicle 4 is turned on.

In step S001, the reception unit 30 of the communication function 20 determines whether a request byte string of a new collection request has been received from the server device 3. When it is determined that a new request byte string has been received, the reception unit 30 proceeds to step S002. When it is determined that no new request byte string has been received, the reception unit 30 proceeds to step S003.

In step S002, the reception unit 30 deserializes the received request byte string to restore the collection request. The deserialization is inverse conversion of serialization. The restored collection request has the same content as the collection request transmitted from the server device 3. The reception unit 30 transmits the restored collection request to the setting unit 40, and proceeds to step S003 when the transmission is completed.

In step S003, the transmission unit 31 of the communication function 20 determines whether the transmission standby unit 60 keeps new standby data in a standby state. When it is determined that new standby data stands by, the transmission unit 31 proceeds to step S004. When it is determined that no new standby data stands by, the transmission unit 31 ends the communication program illustrated in FIG. 4.

In step S004, the transmission unit 31 determines whether communication between the vehicle 4 and the server device 3 is established. The vehicle 4 and the server device 3 are connected to each other via a mobile phone communication network. The transmission unit 31 determines whether the communication is established by transmitting confirmation packets between the vehicle 4 and the server device 3. When it is determined that the communication has been established, the transmission unit 31 proceeds to step S005. When it is determined that the communication has not been established, the transmission unit 31 ends the communication program illustrated in FIG. 4.

In step S005, the transmission unit 31 serializes the standby data of the transmission standby unit 60 to calculate a standby data byte string.

In step S006, the transmission unit 31 transmits the calculated standby data byte string to the server device 3. This enables the server device 3 to collect vehicle data. After step S006, the transmission unit 31 ends the communication program illustrated in FIG. 4.

Figure 5:
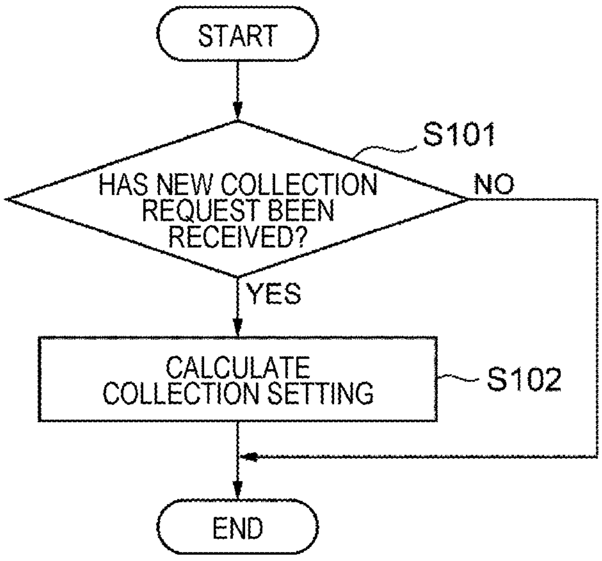
FIG. 5 is a flowchart of a setting program constituting a setting function illustrated in FIG. 3.

FIG. 5 is a flowchart of the setting program constituting the setting function 21 illustrated in FIG. 3. The CPU of the ECU constituting the setting function 21 repeatedly executes the setting program illustrated in FIG. 5 at every predetermined operation cycle while the power supply of the vehicle 4 is turned on.

In step S101, the setting unit 40 of the setting function 21 determines whether a new collection request has been received from the reception unit 30. When it is determined that a new collection request has been received, the setting unit 40 proceeds to step S102. When it is determined that no new collection request has been received, the setting unit 40 ends the setting program illustrated in FIG. 5.

In step S102, the setting unit 40 calculates and determines a collection setting from the received collection request. When the capacity of the memory constituting the multi-stage holding unit 53 5 is insufficient, the setting unit 40 determines a collection setting by changing the number of pieces of collected data held in the multi-stage holding unit 53 from the set value included in the collection request. The setting unit 40 transmits the determined collection setting to the determination data output unit 50, the collection condition determination unit 51, the collected data output unit 52, and the multi-stage holding unit 53. As a result, the vehicle data collection device 5 can execute the collection program of the collection function 23 while suppressing communication constraints and cost increases even in a case where specifications of a plurality of vehicles (in particular, specifications of ECUs) selected according to the range included in the administrator setting are different. Therefore, the vehicle data collection device 5 can flexibly collect vehicle data before and after the collection condition is satisfied while Suppressing communication constraints and cost increases. After step S102, the setting unit 40 ends the setting program illustrated in FIG. 5.

Figure 6:
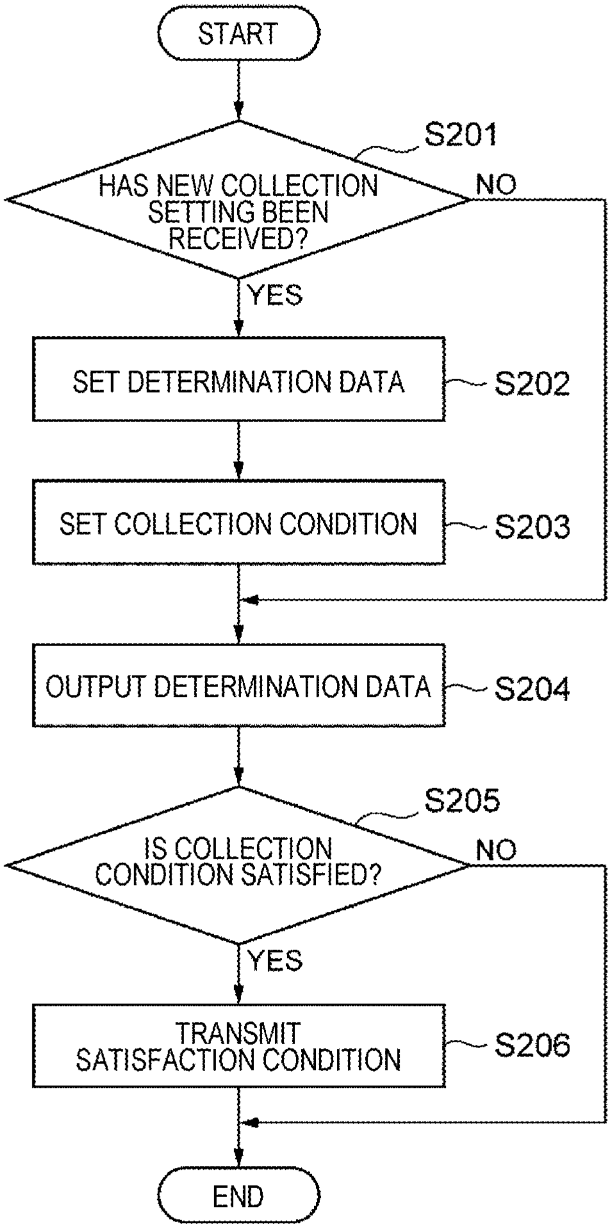
FIG. 6 is a flowchart of a determination program constituting a determination function illustrated in FIG. 3.

FIG. 6 is a flowchart of the determination program constituting the determination function 22 illustrated in FIG. 3. The CPU of the ECU constituting the determination function 22 repeatedly executes the determination program illustrated in FIG. 6 at every predetermined operation cycle while the power supply of the vehicle 4 is turned on.

In step S201, the determination data output unit 50 of the determination function 22 determines whether a new collection setting has been received from the setting unit 40. When it is determined that a new collection setting has been received, the determination data output unit 50 proceeds to step S202. When it is determined that no new collection setting has been received, the determination data output unit 50 proceeds to step S204.

In step S202, the determination data output unit 50 sets determination data based on the received collection setting. Specifically, the determination data output unit 50 specifies a control signal that matches the collection setting from among control signals of the ECU constituting the determination function 22. Then, the determination data output unit 50 sets the specified control signal in determination data as vehicle data to be determined when the collection condition determination unit 51 determines whether the collection condition is satisfied.

In step S203, the collection condition determination unit 51 of the determination function 22 sets a collection condition based on the received collection setting. Specifically, the collection condition determination unit 51 specifies a conditional expression for determining the determination data to match the collection setting, and sets the specified conditional expression for determination as the collection condition.

In step S204, the determination data output unit 50 acquires the determination data from the ECU and outputs the determination data to the collection condition determination unit 51. Specifically, the determination data output unit 50 acquires a control signal that matches the set determination data from among control signals of the ECU constituting the determination function 22. Then, the determination data Output unit 50 outputs the acquired control signal to the collection condition determination unit 51 as determination data.

In step S205, the collection condition determination unit 51 determines whether the set collection condition is satisfied. Specifically, the collection condition determination unit 51 determines whether the collection condition is satisfied by determining whether the determination data output from the determination data output unit 50 satisfies the specified conditional expression for determination. When it is determined that the collection condition is satisfied, the collection condition determination unit 51 proceeds to step S206. When it is determined that the collection condition is not satisfied, the collection condition determination unit 51 ends the determination program illustrated in FIG. 6. A plurality of collection conditions may be set. In this case, when it is determined that any of the set collection conditions is satisfied, the collection condition determination unit proceeds to step S206, and when it is determined that none of the set collection conditions is satisfied, the collection condition determination unit 51 ends the determination program illustrated in FIG. 6.

In step S206, the collection condition determination unit 51 transmits the satisfaction condition indicating the satisfied collection condition to the multi-stage holding unit 53. After step S206, the collection condition determination unit 51 ends the determination program illustrated in FIG. 6.

Figure 7:
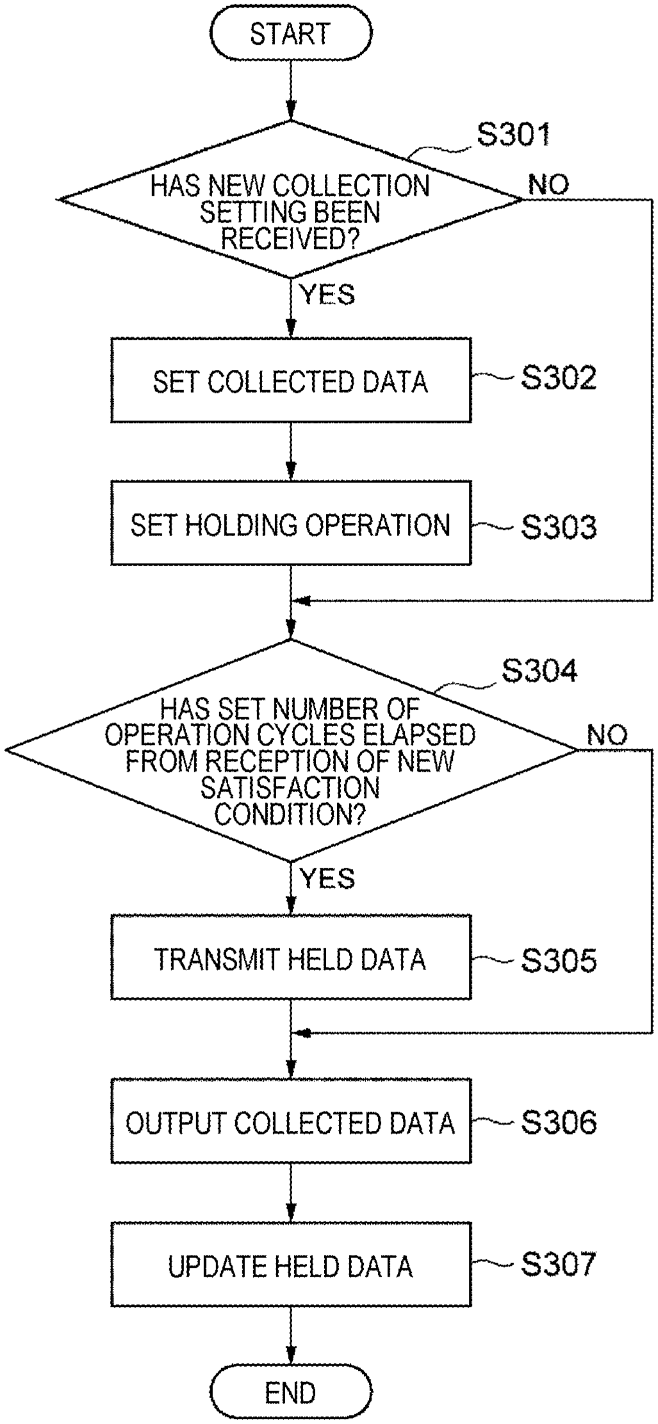
FIG. 7 is a flowchart of a collection program constituting a collection function illustrated in FIG. 3.

FIG. 7 is a flowchart of the collection program constituting the collection function 23 illustrated in FIG. 3. The CPU of the ECU constituting the collection function 23 repeatedly executes the collection program illustrated in FIG. 7 at every predetermined operation cycle while the power supply of the vehicle 4 is turned on.

In step S301, the collected data output unit 52 of the collection function 23 determines whether a new collection setting has been received from the setting unit 40. When it is determined that a new collection setting has been received, the collected data output unit 52 proceeds to step S302. When it is determined that no new collection setting has been received, the collected data output unit 52 proceeds to step S304.

In step S302, the collected data output unit 52 sets collected data based on the received collection setting. Specifically, the collected data output unit 52 specifies a control signal that matches the collection setting from among control signals of the ECU constituting the collection function 23. Then, the collected data output unit 52 sets the specified control signal as vehicle data to be collected in the collected data.

In step S303, the multi-stage holding unit 53 of the collection function 23 sets a holding operation of the multi-stage holding unit 53 that holds the set collected data based on the received collection setting. Specifically, the multi-stage holding unit 53 sets the number of pieces of collected data held in the multi-stage holding unit 53 based on the received collection setting. The number of pieces of collected data held in the multi-stage holding unit 53 is the sum of the number of pieces of collected data output before the collection condition is satisfied and held in the multi-stage holding unit 53 and the number of pieces of collected data output after the collection condition is satisfied and held in the multi-stage holding unit 53.

The collection request transmitted from the reception unit 30 includes a first set value related to the number of pieces of collected data output before the collection condition is satisfied and held in the multi-stage holding unit 53, and a second set value related to the number of pieces of collected data output after the collection condition is satisfied and held in the multi-stage holding unit 53.

The number of pieces of collected data output before the collection condition is satisfied and held in the multi-stage holding unit 53 is defined by how many operation cycles of the CPU of the ECU constituting the collection function 23 are to be traced back from the time when the collection condition is satisfied (the time when the satisfaction condition is received) in holding the output collected data in the multi-stage holding unit 53. Similarly, the number of pieces of collected data output after the collection condition is satisfied and held in the multi-stage holding unit 53 is defined by how many operation cycles of the CPU of the ECU constituting the collection function 23 are to elapse from the time when the collection condition is satisfied (the time when the satisfaction condition is received) in holding the output collected data in the multi-stage holding unit 53. Therefore, in the first set value included in the collection request, the number of operation cycles to be traced back from the time when the collection condition is satisfied (the time when the satisfaction condition is received) is defined. Similarly, in the second set value included in the collection request, the number of operation cycles to elapse from the time when the collection condition is satisfied (the time when the satisfaction condition is received) is defined.

When the capacity of the memory constituting the multi-stage holding unit 53 is insufficient, the setting unit 40 determines a collection setting by changing the number of pieces of collected data held in the multi-stage holding unit 53 from the first set value and the second set value included in the collection request, and transmits the determined collection setting to the multi-stage holding unit 53. Based on the received collection setting, the multi-stage holding unit 53 sets the number of pieces of collected data corresponding to the number of operation cycles indicated by the changed first set value as the number of pieces of held collected data output before the collection condition is satisfied, and sets the number of pieces of collected data corresponding to the number of operation cycles indicated by the changed second set value as the number of pieces of held collected data output after the collection condition is satisfied.

In step S304, the multi-stage holding unit 53 determines whether operation cycles have elapsed as many as the number of times set based on the second set value after the reception of the new satisfaction condition from the collection condition determination unit 51. When it is determined that operation cycles have elapsed as many as the number of times set based on the second set value after the reception of the new satisfaction condition, the multi-stage holding unit 53 proceeds to step S305. When it is determined that no new satisfaction condition has been received, or when it is determined that operation cycles have not elapsed as many as the number of times set based on the second set value after the reception of the new satisfaction condition, the multi-stage holding unit 53 proceeds to step S306.

In step S305, the multi-stage holding unit 53 transmits the held data to the transmission standby unit 60 with a low priority. When the held data is transmitted from the multi-stage holding unit 53 to the transmission standby unit 60 are via a control area network (CAN), the multi-stage holding unit 53 allocates an identifier (ID) having a lower priority than other messages to the held data. When the held data is transmitted from the multi-stage holding unit 53 to the transmission standby unit 60 via time-sensitive networking (TSN), the multi-stage holding unit 53 transmits the held data in a low-priority window. As a result, the multi-stage holding unit 53 can transmit the held data to the transmission standby unit 60 without constraining other communications.

In step S306, the collected data output unit 52 acquires collected data from the ECU and outputs the collected data to the multi-stage holding unit 53. Specifically, the collected data output unit 52 acquires a control signal that matches the set collected data from among control signals of the ECU constituting the collection function 23. Then, the collected data output unit 52 outputs the acquired control signal to the multi-stage holding unit 53 as collected data.

In step S307, the multi-stage holding unit 53 updates the held data of the multi-stage holding unit 53. Specifically, the multi-stage holding unit 53 deletes the held collected data from the oldest one in chronological order, and sequentially holds collected data output from the collected data output unit 52. After step S307, the multi-stage holding unit 53 ends the collection program illustrated in FIG. 7.

Figure 8:
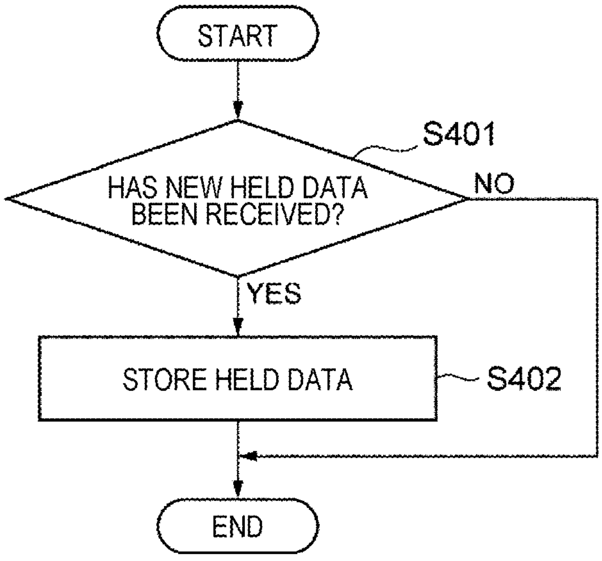
FIG. 8 is a flowchart of a standby program constituting a standby function illustrated in FIG. 3.

FIG. 8 is a flowchart of the standby program constituting the standby function 24 illustrated in FIG. 3. The CPU of the ECU constituting the standby function 24 repeatedly executes the standby program illustrated in FIG. 8 at every predetermined operation cycle while the power supply of the vehicle 4 is turned on.

In step S401, the transmission standby unit 60 of the standby function 24 determines whether new held data has been received from the multi-stage holding unit 53. When it is determined that new held data has been received, the transmission standby unit 60 proceeds to step S402. When it is determined that no new held data has been received, the transmission standby unit 60 ends the standby program illustrated in FIG. 8.

In step S402, the transmission standby unit 60 stores the received held data in the memory constituting the transmission standby unit 60, and keeps the received held data in a standby state as standby data until communication between the server device 3, which is a request source, and the vehicle 4 is established. After step S402, the transmission standby unit 60 ends the standby program illustrated in FIG. 8.

Figure 9:
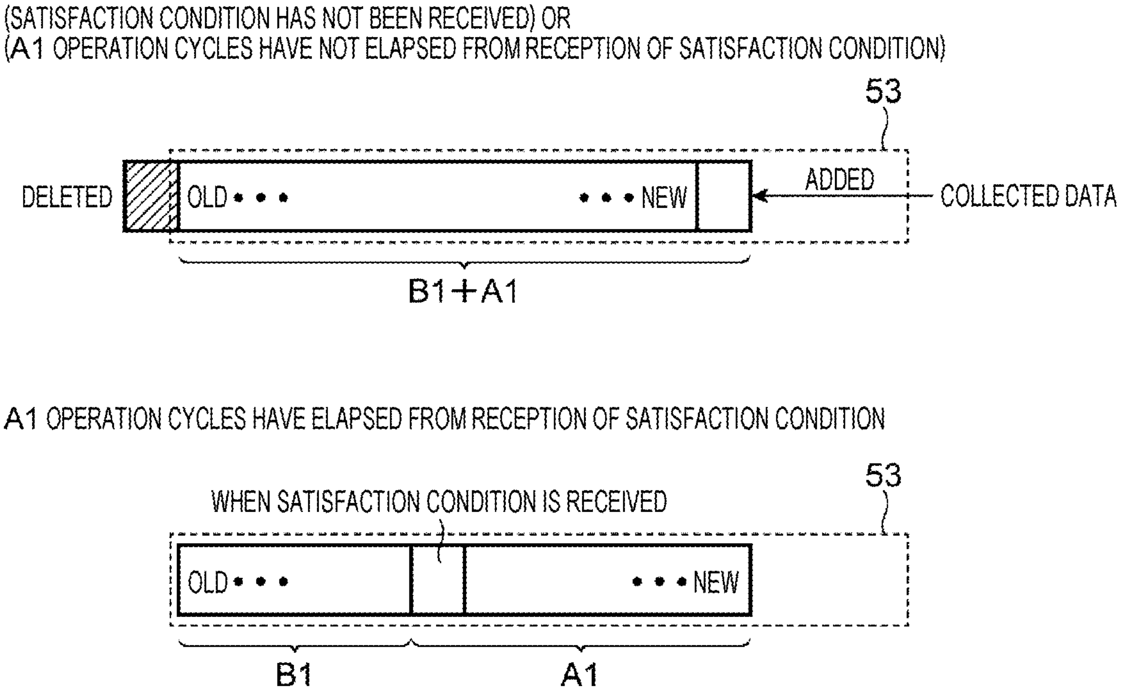
FIG. 9 is a diagram for explaining an operation of a multi-stage holding unit illustrated in FIG. 3.

FIG. 9 is a diagram for explaining the operation of the multi-stage holding unit 53 illustrated in FIG. 3. FIG. 9 illustrates an example of a case where only one type of vehicle data is collected as collected data, and the volatile memory of the ECU constituting the collection function 23 has a capacity necessary for executing a collection request. As described above, the number of pieces of collected data held in the multi-stage holding unit 53 is defined by a first set value B1 and a second set value A1 included in the collection request. The setting unit 40 determines a collection setting based on the first set value B1 and the second set value A1. In the present embodiment, the number of operation cycles indicated by the first set value B1 is defined as "B1", and the number of operation cycles indicated by the second set value A1 is defined as "A1".

When no new satisfaction condition has been received from the collection condition determination unit 51, or when A1 operation cycles have not elapsed from the reception of the new satisfaction condition, upon receipt of new collected data, the multi-stage holding unit 53 deletes collected data older than the collected data for (B1+A1) operation cycles held in the multi-stage holding unit 53, and sequentially holds new collected data and updates the held data. The multi-stage holding unit 53 holds data collected from the past to the present for (B1+A1) operation cycles.

When the A1 operation cycles have elapsed after the new satisfaction condition is received from the collection condition determination unit 51, the multi-stage holding unit 53 holds collected data output before the satisfaction condition is received for B1 operation cycles and collected data output after the satisfaction condition is received for A1 operation cycles. The multi-stage holding unit 53 stops updating the held data, and transmits the held data to the transmission standby unit 60 with a low priority. As a result, the vehicle data collection device 5 can collect collected data output before the collection condition is satisfied for B1 operation cycles, and collect collected data output after the collection condition is satisfied for A1 operation cycles.

Figure 10:
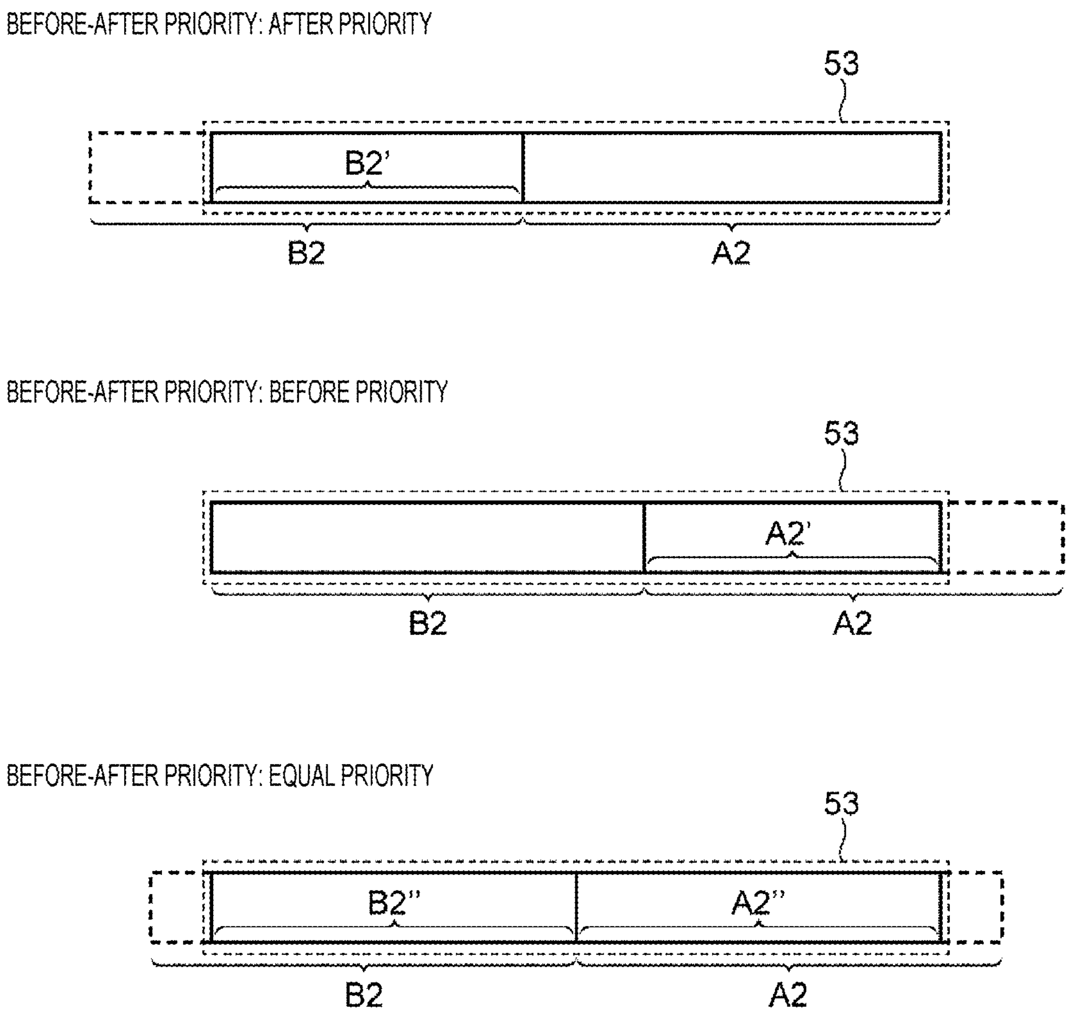
FIG. 10 is a diagram for explaining an operation of the multi-stage holding unit in a case where the setting unit illustrated in FIG. 3 determines a collection setting based on a before-after priority.

FIG. 10 is a diagram for explaining an operation of the multi-stage holding unit 53 in a case where the setting unit 40 illustrated in FIG. 3 determines a collection setting based on a before-after priority. FIG. 10 illustrates an example of a case where only one type of vehicle data is collected as collected data, and the volatile memory of the ECU constituting the collection function 23 does not have a capacity necessary for executing a collection request.

The collection request includes a first set value B2, a second set value A2, and a before-after priority. The before-after priority is information for setting which of collected data output before the collection condition is satisfied and collected data output after the collection condition is satisfied is to be preferentially held in the multi-stage holding unit 53.

The before-after priority includes before priority, after priority, and equal priority. The before priority is setting information for preferentially holding collected data output before the collection condition is satisfied as compared with collected data output after the collection condition is satisfied. The after priority is setting information for preferentially holding collected data output after the collection condition is satisfied as compared with collected data output before the collection condition is satisfied. The equal priority is setting information for giving no priority relationship between collected data output before the collection condition is satisfied and collected data output after the collection condition is satisfied.

The before-after priority is set according to the purpose of collecting vehicle data. For example, in a case where sensor data is collected when a near miss occurs from an automatic driving vehicle for used in learning of AI, a process until the occurrence of the near miss is important, and thus, the before-after priority can be set to before priority.

The setting unit 40 determines a collection setting to change the number of pieces of collected data held in the multi-stage holding unit 53 by changing at least one of the first set value B2 and the second set value A2 based on the capacity of the memory of the ECU constituting the multi-stage holding unit 53 and the before-after priority.

For example, when the capacity of the memory constituting the multi-stage holding unit 53 is insufficient to hold the collected data for (B2+A2) operation cycles and the before-after priority included in the collection request is after priority, the setting unit determines a collection setting by changing the first set value to B2' smaller than B2.

When no new satisfaction condition has been received from the collection condition determination unit 51, or when A2 operation cycles have not elapsed from the reception of the new satisfaction condition, upon receipt of new collected data, the multi-stage holding unit 53 deletes collected data older than the collected data for (B2'+A2) operation cycles held in the multi-stage holding unit 53, and sequentially holds new collected data and updates the held data. The multi-stage holding unit 53 holds data collected from the past to the present for (B2'+A2) operation cycles.

When the A2 operation cycles have elapsed after the new satisfaction condition is received from the collection condition determination unit 51, the multi-stage holding unit 53 holds collected data output before the satisfaction condition is received for B2' operation cycles and collected data output after the satisfaction condition is received for A2 operation cycles. The multi-stage holding unit 53 stops updating the held data, and transmits the held data to the transmission standby unit 60 with a low priority. As a result, the vehicle data collection device 5 can collect collected data output before the collection condition is satisfied for B2' operation cycles, and collect collected data output after the collection condition is satisfied for A2 operation cycles.

In addition, for example, when the capacity of the memory constituting the multi-stage holding unit 53 is insufficient to hold the collected data for (B2+A2) operation cycles and the before-after priority included in the collection request is before priority, the setting unit 40 determines a collection setting by changing the second set value to A2' smaller than A2.

When no new satisfaction condition has been received from the collection condition determination unit 51, or when A2' operation cycles have not elapsed from the reception of the new satisfaction condition, upon receipt of new collected data, the multi-stage holding unit 53 deletes collected data older than the collected data for (B2+A2') operation cycles held in the multi-stage holding unit 53, and sequentially holds new collected data and updates the held data. The multi-stage holding unit 53 holds data collected from the past to the present for (B2+A2') operation cycles.

When the A2' operation cycles have elapsed after the new satisfaction condition is received from the collection condition determination unit 51, the multi-stage holding unit 53 holds collected data output before the satisfaction condition is received for B2 operation cycles and collected data output after the satisfaction condition is received for A2' operation cycles. The multi-stage holding unit 53 stops updating the held data, and transmits the held data to the transmission standby unit 60 with a low priority. As a result, the vehicle data collection device 5 can collect collected data output before the collection condition is satisfied for B2 operation cycles, and collect collected data output after the collection condition is satisfied for A2' operation cycles.

In addition, for example, when the capacity of the memory constituting the multi-stage holding unit 53 is insufficient to hold the collected data for (B2+A2) operation cycles and the before-after priority included in the collection request is equal priority, the setting unit 40 determines a collection setting by changing the first set value to B2" smaller than B2, and changing the second set value to A2" smaller than A2.

When no new satisfaction condition has been received from the collection condition determination unit 51, or when A2" operation cycles have not elapsed from the reception of the new satisfaction condition, upon receipt of new collected data, the multi-stage holding unit 53 deletes collected data older than the collected data for (B2"+A2") operation cycles held in the multi-stage holding unit 53, and sequentially holds new collected data and updates the held data. The multi-stage holding unit 53 holds data collected from the past to the present for (B2"+A2") operation cycles (B2"=A2").

When the A2" operation cycles have elapsed after the new satisfaction condition is received from the collection condition determination unit 51, the multi-stage holding unit 53 holds collected data output before the satisfaction condition is received for B2" operation cycles and collected data output after the satisfaction condition is received for A2" operation cycles. The multi-stage holding unit 53 stops updating the held data, and transmits the held data to the transmission standby unit 60 with a low priority. As a result, the vehicle data collection device 5 can collect collected data output before the collection condition is satisfied for B2" operation cycles, and collect collected data output after the collection condition is satisfied for A2" operation cycles.

In this manner, the vehicle data collection request can include a before-after priority according to the purpose of collecting vehicle data. As a result, even in a case where specifications of a plurality of vehicles selected according to the range included in the administrator setting are different and the capacity of the memory constituting the multi-stage holding unit 53 is insufficient, the vehicle data collection device 5 can determine the collection setting by changing the content of the collection request so that the collection program of the collection function 23 can be executed. Therefore, the vehicle data collection device 5 can flexibly collect vehicle data before and after the collection condition is satisfied while suppressing communication constraints and cost increases.

FIG. 11 is a diagram for explaining an operation of the multi-stage holding unit 53 in a case where the setting unit 40 illustrated in FIG. 3 determines a collection setting based on a condition priority. FIG. 11 illustrates an example of a case where collected data D31 is output when a satisfaction condition C31 is received as the collection condition C31 is satisfied and collected data D32 is output when a satisfaction condition C32 is received as the collection condition C32 is satisfied, and the volatile memory of the ECU constituting the collection function 23 does not have a capacity necessary for executing a collection request.

The collection request includes a first set value B31, a second set value A31, and a before-after priority for the collected data D31, and includes a first set value B32, a second set value A32, and a before-after priority for the collected data D32. Further, the collection request includes a condition priority. The condition priority is information for setting which collection condition is to be given priority, among a plurality of collection conditions, in holding collected data in the multi-stage holding unit 53. The condition priority is set according to the purpose of collecting vehicle data. For example, in a case where the satisfaction condition C31 occurs at a lower frequency than the satisfaction condition C32, the condition priority can be set to satisfaction condition C31 priority.

The setting unit 40 determines a collection setting to change the number of pieces of collected data D31 and D32 held in the multi-stage holding unit 53 by changing at least one of the first set values B31 and B32 and the second set values A31 and A32 based on the capacity of the memory constituting the multi-stage holding unit 53 and the condition priority.

For example, when the capacity of the memory constituting the multi-stage holding unit 53 is insufficient to hold collected data D31 for (B31+A31) operation cycles and collected data D32 for (B32+A32) operation cycles, the condition priority included in the collection request is satisfaction condition C31, and the before-after priority for the collected data D32 is after priority, the setting unit 40 determines a collection setting by changing the first set value for the collected data D32 to B32' smaller than B32. The setting unit 40 determines the collection setting by leaving the second set value for the collected data D32 unchanged at A32, leaving the first set value for the collected data D31 unchanged at B31, and leaving the second set value for the collected data D31 unchanged at A31.

When no new satisfaction condition C31 has been received from the collection condition determination unit 51, or when A31 operation cycles have not elapsed from the reception of the new satisfaction condition C31, upon receipt of new collected data D31, the multi-stage holding unit 53 deletes collected data D31 older than the collected data D31 for (B31+A31) operation cycles held in the multi-stage holding unit 53, and sequentially holds new collected data D31 and updates the held data. The multi-stage holding unit 53 holds data D31 collected from the past to the present for (B31+A31) operation cycles.

When the A31 operation cycles have elapsed after the new satisfaction condition C31 is received from the collection condition determination unit 51, the multi-stage holding unit 53 holds collected data D31 output before the satisfaction condition C31 is received for B31 operation cycles and collected data D31 output after the satisfaction condition C31 is received for A31 operation cycles. The multi-stage holding unit 53 stops updating the held data, and transmits the held data to the transmission standby unit 60 with a low priority. As a result, the vehicle data collection device 5 can collect collected data D31 output before the collection condition C31 is satisfied for B31 operation cycles, and collect collected data D31 output after the collection condition C31 is satisfied for A31 operation cycles.

On the other hand, when no new satisfaction condition C32 has been received from the collection condition determination unit 51, or when A32 operation cycles have not elapsed from the reception of the new satisfaction condition C32, upon receipt of new collected data D32, the multi-stage holding unit 53 deletes collected data D32 older than the collected data D32 for (B32'+A32) operation cycles held in the multi-stage holding unit 53, and sequentially holds new collected data D32 and updates the held data. The multi-stage holding unit 53 holds data D32 collected from the past to the present for (B32'+A32) operation cycles.

When the A32 operation cycles have elapsed after the new satisfaction condition C32 is received from the collection condition determination unit 51, the multi-stage holding unit 53 holds collected data D32 output before the satisfaction condition C32 is received for B32' operation cycles and collected data D32 output after the satisfaction condition C32 is received for A32 operation cycles. The multi-stage holding unit 53 stops updating the held data, and transmits the held data to the transmission standby unit 60 with a low priority. As a result, the vehicle data collection device 5 can collect collected data D32 output before the collection condition C32 is satisfied for B32' operation cycles, and collect collected data D32 output after the collection condition C32 is satisfied for A32 operation cycles.

In addition, for example, when the capacity of the memory constituting the multi-stage holding unit 53 is insufficient to hold collected data D31 for (B31+A31) operation cycles and collected data D32 for (B32+A32) operation cycles, the condition priority included in the collection request is satisfaction condition C32, and the before-after priority for the collected data D31 is the before priority, the setting unit 40 determines a collection setting by changing the second set value for the collected data D31 to A31' smaller than A31. The setting unit 40 determines the collection setting by leaving the first set value for the collected data D31 unchanged at B31, leaving the first set value for the collected data D32 unchanged at B32, and leaving the second set value for the collected data D32 unchanged at A32.

When no new satisfaction condition C31 has been received from the collection condition determination unit 51, or when A31 operation cycles have not elapsed from the reception of the new satisfaction condition C31, upon receipt of new collected data D31, the multi-stage holding unit 53 deletes collected data D31 older than the collected data D31 for (B31+A31') operation cycles held in the multi-stage holding unit 53, and sequentially holds new collected data D31 and updates the held data. The multi-stage holding unit 53 holds data D31 collected from the past to the present for (B31+A31') operation cycles.

When the A31' operation cycles have elapsed after the new satisfaction condition C31 is received from the collection condition determination unit 51, the multi-stage holding unit 53 holds collected data D31 output before the satisfaction condition C31 is received for B31 operation cycles and collected data D31 output after the satisfaction condition C31 is received for A31' operation cycles. The multi-stage holding unit 53 stops updating the held data, and transmits the held data to the transmission standby unit 60 with a low priority. As a result, the vehicle data collection device 5 can collect collected data D31 output before the collection condition C31 is satisfied for B31 operation cycles, and collect collected data D31 output after the collection condition C31 is satisfied for A31' operation cycles.

On the other hand, when no new satisfaction condition C32 has been received from the collection condition determination unit 51, or when A32 operation cycles have not elapsed from the reception of the new satisfaction condition C32, upon receipt of new collected data D32, the multi-stage holding unit 53 deletes collected data D32 older than the collected data D32 for (B32+A32) operation cycles held in the multi-stage holding unit 53, and sequentially holds new collected data D32 and updates the held data. The multi-stage holding unit 53 holds data D32 collected from the past to the present for (B32+A32) operation cycles.

When the A32 operation cycles have elapsed after the new satisfaction condition C32 is received from the collection condition determination unit 51, the multi-stage holding unit 53 holds collected data D32 output before the satisfaction condition C32 is received for B32 operation cycles and collected data D32 output after the satisfaction condition C32 is received for A32 operation cycles. The multi-stage holding unit 53 stops updating the held data, and transmits the held data to the transmission standby unit 60 with a low priority. As a result, the vehicle data collection device 5 can collect collected data D32 output before the collection condition C32 is satisfied for B32 operation cycles, and collect collected data D32 output after the collection condition C32 is satisfied for A32 operation cycles.

In this manner, the vehicle data collection request can include a condition priority according to the purpose of collecting vehicle data. As a result, even in a case where specifications of a plurality of vehicles selected according to the range included in the administrator setting are different and the capacity of the memory constituting the multi-stage holding unit 53 is insufficient, the vehicle data collection device 5 can determine the collection setting by changing the content of the collection request so that the collection program of the collection function 23 can be executed. Therefore, the vehicle data collection device 5 can flexibly collect vehicle data before and after the collection condition is satisfied while suppressing communication constraints and cost increases.

FIG. 12 is a diagram for explaining an operation of the multi-stage holding unit 53 in a case where the setting unit 40 illustrated in FIG. 3 determines a collection setting based on a format priority. FIG. 12 illustrates an example of a case where collected data D31 is output when a satisfaction condition C31 is received as the collection condition C31 is satisfied and collected data D32 is output when a satisfaction condition C32 is received as the collection condition C32 is satisfied, and the volatile memory of the ECU constituting the collection function 23 does not have a capacity necessary for executing a collection request.

The collection request includes a first set value B31, a second set value A31, a before-after priority, and a format priority for the collected data D31, and includes a first set value B32, a second set value A32, a before-after priority, and a format priority for the collected data D32. Further, the collection request includes a condition priority. The format priority is information for setting whether to give priority to maintenance of the format in which the collected data set by the first set value and the second set value is held in the multi-stage holding unit 53.

The format priority includes format maintenance priority and format non-maintenance priority. The format maintenance priority is setting information for giving priority to maintenance of the format in which the collected data set by the first set value and the second set value is held. The format non-maintenance priority is setting information for giving no priority to maintenance of the format in which the collected data set by the first set value and the second set value is held.

The format priority is set according to the purpose of collecting vehicle data. For example, in a case where the vehicle data is used for learning of AI, it is often desired to collect vehicle data in a predetermined format, and thus, the format priority can be set to format maintenance priority. For example, in a case where vehicle data is used for verification of software, it is often desired to collect vehicle data when the collection condition is satisfied without omission, and thus, the format priority can be set to format non-maintenance priority.

The setting unit 40 determines a collection setting to change the number of pieces of collected data D31 and D32 held in the multi-stage holding unit 53 by changing at least one of the first set values B31 and B32 and the second set values A31 and A32 based on the capacity of the memory constituting the multi-stage holding unit 53 and the format priority. At this time, when the format priority is format maintenance priority and it is difficult to maintain the format in which the collected data D31 and D32 set by the first set values B31 and B32 is held and the second set values A31 and A32, the setting unit 40 determines a collection setting to exclude the collected data D31 and D32 from data to be collected.

For example, when the capacity of the memory constituting the multi-stage holding unit 53 is insufficient to hold collected data D31 for (B31+A31) operation cycles and collected data D32 for (B32+A32) operation cycles, the condition priority included in the collection request is satisfaction condition C31, the before-after priority for the collected data D32 is after priority, and the format priority for the collected data D32 is format non-maintenance priority, the setting unit 40 determines a collection setting by changing the first set value for the collected data D32 to B32' smaller than B32. The setting unit 40 determines the collection setting by leaving the second set value for the collected data D32 unchanged at A32, leaving the first set value for the collected data D31 unchanged at B31, and leaving the second set value for the collected data D31 unchanged at A31.

When no new satisfaction condition C31 has been received from the collection condition determination unit 51, or when A31 operation cycles have not elapsed from the reception of the new satisfaction condition C31, upon receipt of new collected data D31, the multi-stage holding unit 53 deletes collected data D31 older than the collected data D31 for (B31+A31) operation cycles held in the multi-stage holding unit 53, and sequentially holds new collected data D31 and updates the held data. The multi-stage holding unit 53 holds data D31 collected from the past to the present for (B31+A31) operation cycles.

When the A31 operation cycles have elapsed after the new satisfaction condition C31 is received from the collection condition determination unit 51, the multi-stage holding unit 53 holds collected data D31 output before the satisfaction condition C31 is received for B31 operation cycles and collected data D31 output after the satisfaction condition C31 is received for A31 operation cycles. The multi-stage holding unit 53 stops updating the held data, and transmits the held data to the transmission standby unit 60 with a low priority. As a result, the vehicle data collection device 5 can collect collected data D31 output before the collection condition C31 is satisfied for B31 operation cycles, and collect collected data D31 output after the collection condition C31 is satisfied for A31 operation cycles.

On the other hand, when no new satisfaction condition C32 has been received from the collection condition determination unit 51, or when A32 operation cycles have not elapsed from the reception of the new satisfaction condition C32, upon receipt of new collected data D32, the multi-stage holding unit 53 deletes collected data D32 older than the collected data D32 for (B32'+A32) operation cycles held in the multi-stage holding unit 53, and sequentially holds new collected data D32 and updates the held data. The multi-stage holding unit 53 holds data D32 collected from the past to the present for (B32'+A32) operation cycles.

When the A32 operation cycles have elapsed after the new satisfaction condition C32 is received from the collection condition determination unit 51, the multi-stage holding unit 53 holds collected data D32 output before the satisfaction condition C32 is received for B32' operation cycles and collected data D32 output after the satisfaction condition C32 is received for A32 operation cycles. The multi-stage holding unit 53 stops updating the held data, and transmits the held data to the transmission standby unit 60 with a low priority. As a result, the vehicle data collection device 5 can collect collected data D32 output before the collection condition C32 is satisfied for B32' operation cycles, and collect collected data D32 output after the collection condition C32 is satisfied for A32 operation cycles. The vehicle data collection device 5 can collect vehicle data when the collection condition is satisfied without omission by setting the format priority to format non-maintenance priority.

In addition, for example, when the capacity of the memory constituting the multi-stage holding unit 53 is insufficient to hold collected data D31 for (B31+A31) operation cycles and collected data D32 for (B32+A32) operation cycles, the condition priority included in the collection request is satisfaction condition C31, the before-after priority for the collected data D32 is after priority, and the format priority for the collected data D32 is format maintenance priority, it is difficult to maintain the format in which the collected data D32 set by the first set value B32 for the collected data D32 is held. Therefore, the setting unit 40 determines a collection setting to exclude the collected data D32 from data to be collected and collect only the collected data D31 based on the first set value B31 and the second set value A31.

When no new satisfaction condition C31 has been received from the collection condition determination unit 51, or when A31 operation cycles have not elapsed from the reception of the new satisfaction condition C31, upon receipt of new collected data D31, the multi-stage holding unit 53 deletes collected data D31 older than the collected data D31 for (B31+A31) operation cycles held in the multi-stage holding unit 53, and sequentially holds new collected data D31 and updates the held data. The multi-stage holding unit 53 holds data D31 collected from the past to the present for (B31+A31) operation cycles.

When the A31 operation cycles have elapsed after the new satisfaction condition C31 is received from the collection condition determination unit 51, the multi-stage holding unit 53 holds collected data D31 output before the satisfaction condition C31 is received for B31 operation cycles and collected data D31 output after the satisfaction condition C31 is received for A31 operation cycles. The multi-stage holding unit 53 stops updating the held data, and transmits the held data to the transmission standby unit 60 with a low priority. As a result, the vehicle data collection device 5 can collect collected data D31 output before the collection condition C31 is satisfied for B31 operation cycles, and collect collected data D31 output after the collection condition C31 is satisfied for A31 operation cycles. By setting the format priority to format maintenance priority, the vehicle data collection device 5 can collect vehicle data only when the vehicle data can be collected in a predetermined format, thereby preventing unnecessary constraints on the capacity of the volatile memory of the ECU constituting the collection function 23 or unnecessary constraints on communication between the ECU constituting the collection function 23 and other ECUs.

In this manner, the vehicle data collection request can include a format priority according to the purpose of collecting vehicle data. As a result, even in a case where specifications of a plurality of vehicles selected according to the range included in the administrator setting are different and the capacity of the memory constituting the multi-stage holding unit 53 is insufficient, the vehicle data collection device 5 can determine the collection setting by changing the content of the collection request so that the collection program of the collection function 23 can be executed. Therefore, the vehicle data collection device 5 can flexibly collect vehicle data before and after the collection condition is satisfied while suppressing communication constraints and cost increases.

Figure 13:
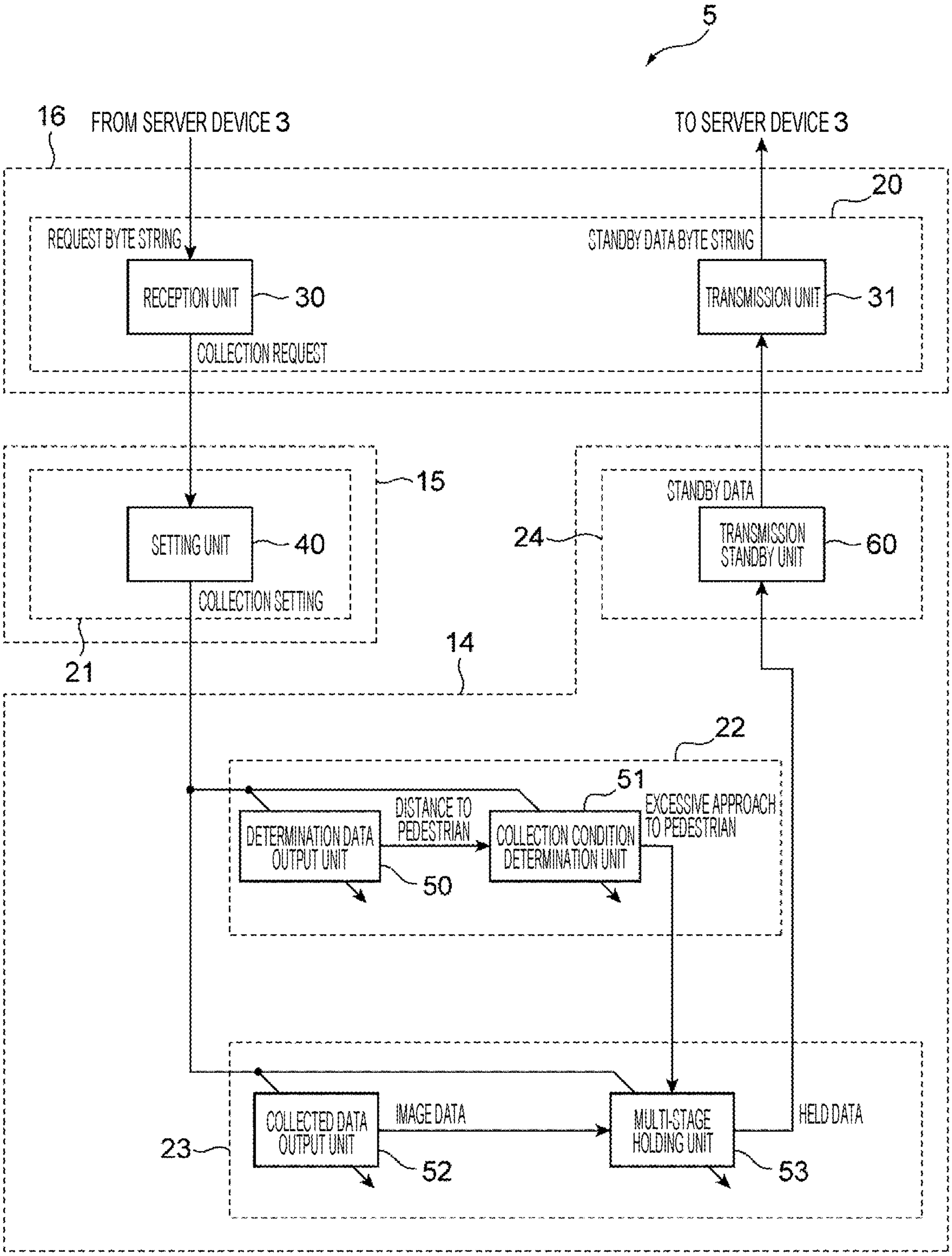
FIG. 13 is a diagram for explaining an example of an operation of the vehicle data collection device illustrated in FIG. 3.

FIG. 13 is a diagram for explaining an example of an operation of the vehicle data collection device 5 illustrated in FIG. 3. FIG. 13 illustrates an example of a case where image data received from the camera 9 is collected when a near miss that is an excessive approach to a pedestrian occurs in order to use the vehicle data for learning of image recognition AI.

The determination data output unit 50 implemented by the automatic driving ECU 14 sets a distance to a pedestrian as determination data (step S202). The collection condition determination unit 51 implemented by the automatic driving ECU 14 sets a collection condition to determine that an excessive approach to a pedestrian has occurred when the distance to the pedestrian becomes equal to or smaller than a predetermined distance (step S203). The collected data output unit 52 implemented by the automatic driving ECU 14 sets image data received from the camera 9 as collected data (step S302). As a result, the vehicle data collection device 5 illustrated in FIG. 13 can collect image data when a near miss that is an excessive approach to a pedestrian occurs.

Figure 14:
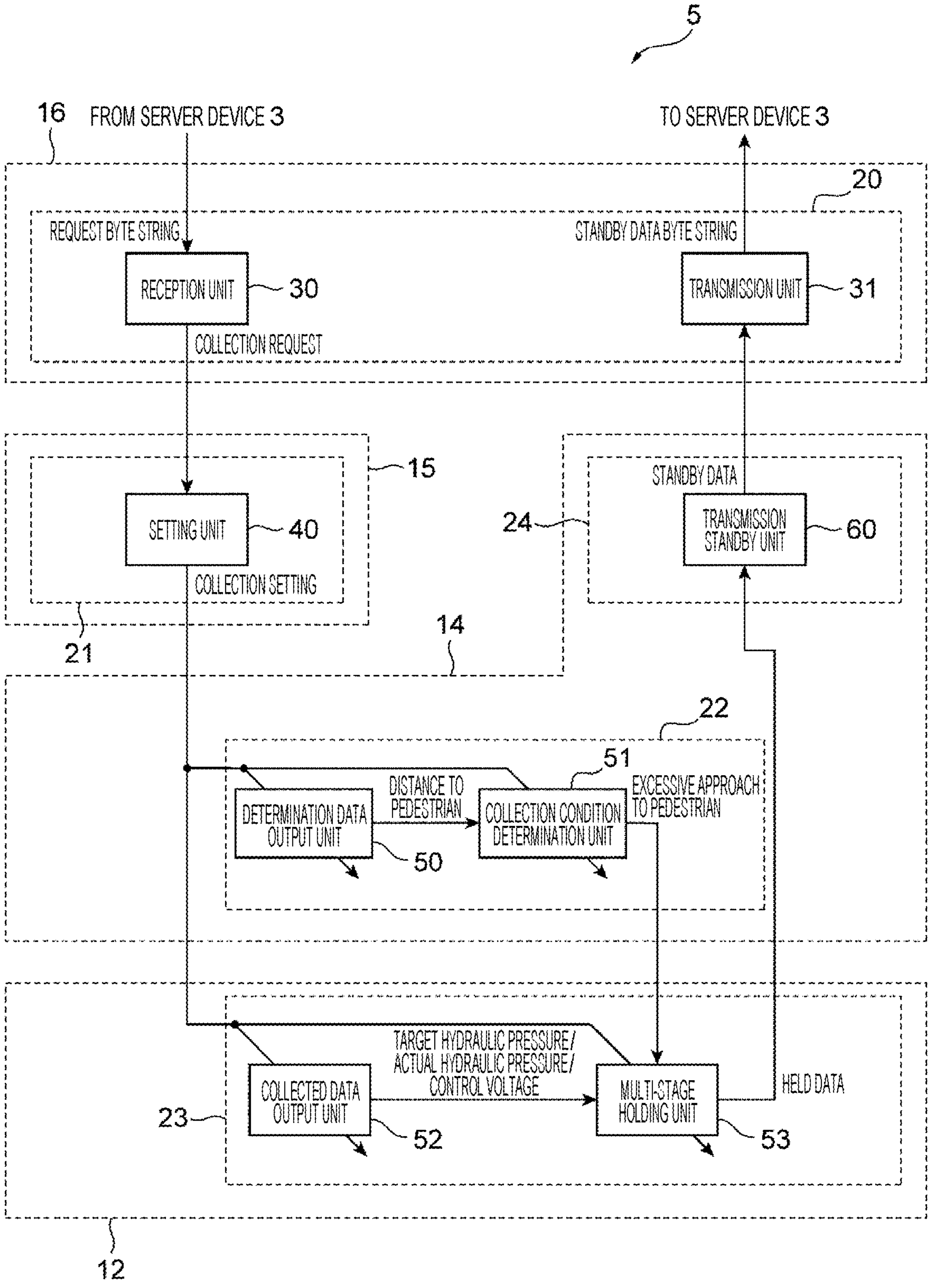
FIG. 14 is a diagram for explaining an example of an operation of the vehicle data collection device illustrated in FIG. 3.

FIG. 14 is a diagram for explaining an example of an operation of the vehicle data collection device 5 illustrated in FIG. 3. FIG. 14 illustrates an example of a case where a target hydraulic pressure and an actual hydraulic pressure of the brake 7, which are inputs to software for controlling the brake 7, and a control voltage of a hydraulic cylinder control motor, which is an output from the software, are collected when a near miss that is an excessive approach to a pedestrian occurs in order to use the vehicle data for verifying the software.

The determination data output unit 50 implemented by the automatic driving ECU 14 sets a distance to a pedestrian as determination data (step S202). The collection condition determination unit 51 implemented by the automatic driving ECU 14 sets a collection condition to determine that an excessive approach to a pedestrian has occurred when the distance to the pedestrian becomes equal to or smaller than a predetermined distance (step S203). The collected data output unit 52 implemented by the brake ECU 12 sets a target hydraulic pressure and an actual hydraulic pressure of the brake 7 and a control voltage of the hydraulic cylinder control motor as collected data (step S302). As a result, the vehicle data collection device 5 illustrated in FIG. 14 can collect a target hydraulic pressure, an actual hydraulic pressure, and a control voltage when a near miss that is an excessive approach to a pedestrian occurs. Note that the vehicle data collection device 5 may simultaneously perform the example illustrated in FIG. 13 and the example illustrated in FIG. 14. As a result, the vehicle data collection device 5 can simultaneously collect the target hydraulic pressure, the actual hydraulic pressure, the control voltage, and the image data when the near miss that is an excessive approach to a pedestrian occurs.

Figure 15:
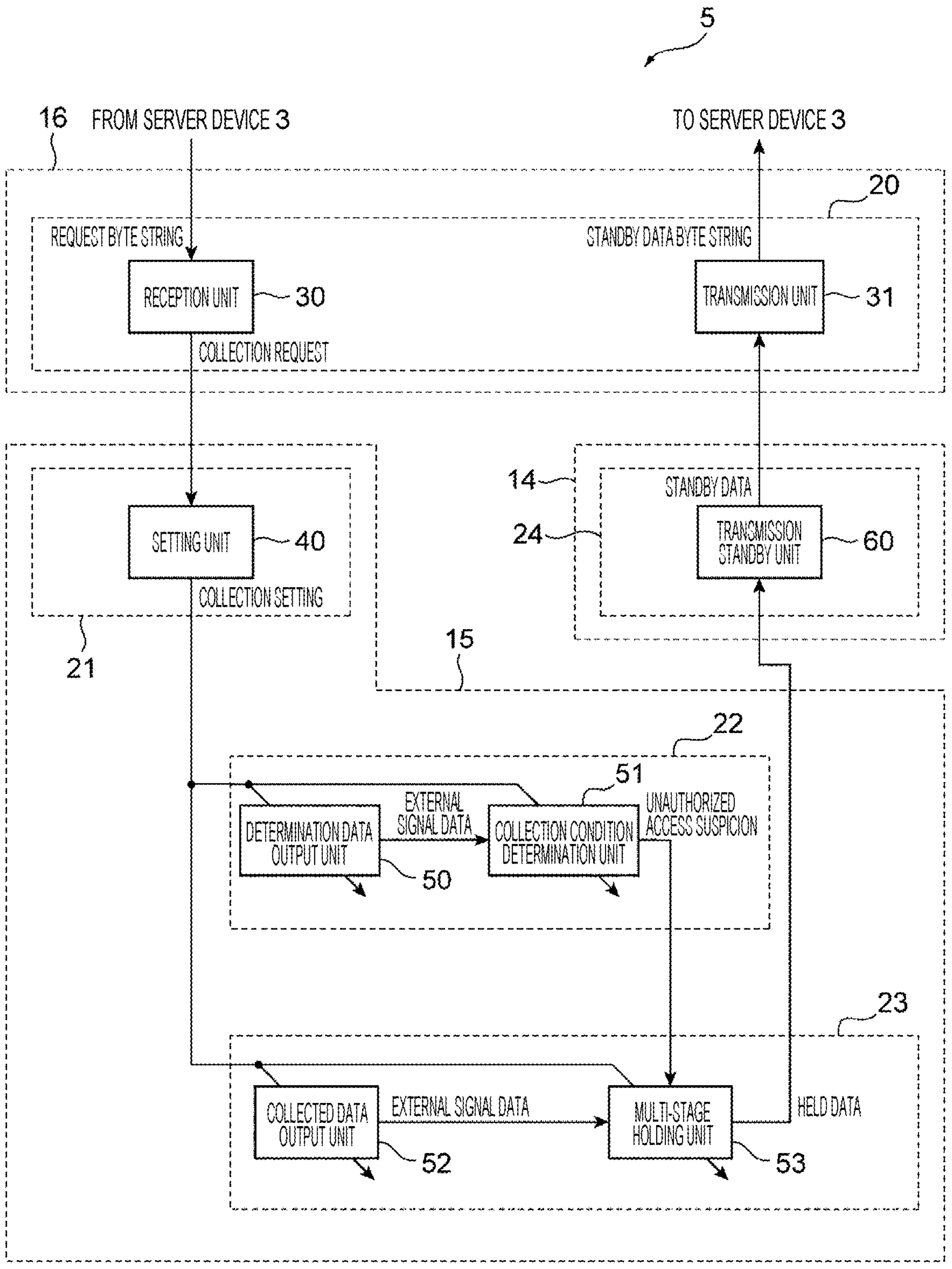
FIG. 15 is a diagram for explaining an example of an operation of the vehicle data collection device illustrated in FIG. 3.

FIG. 15 is a diagram for explaining an example of an operation of the vehicle data collection device 5 illustrated in FIG. 3. FIG. 15 illustrates an example of a case where external signal data transmitted from the outside of the vehicle 4 to the vehicle 4 is collected when an unauthorized access suspicion occurs in order to enhance the security of the vehicle 4.

The determination data output unit 50 implemented by the gateway ECU 15 sets external signal data transmitted from the telematics ECU 16 to the gateway ECU 15 as determination data (step S202). The collection condition determination unit 51 implemented by the gateway ECU 15 sets a collection condition to determine that an unauthorized access suspicion has occurred when a signature of the external signal data matches an unauthorized signature (step S203). The collected data output unit 52 implemented by the gateway ECU 15 sets external signal data transmitted from the telematics ECU 16 to the gateway ECU 15 as collected data (step S302). As a result, the vehicle data collection device 5 illustrated in FIG. 15 can collect the external signal data when an unauthorized access suspicion occurs.

As described above, a vehicle data collection device 5 according to the first embodiment includes: a setting unit 40 that determines a collection setting that is setting information for each ECU corresponding to a collection request; a collection condition determination unit 51 that sets a vehicle data collection condition based on the collection setting, and determines whether the set collection condition is satisfied; a collected data output unit 52 that sets collected data, which is vehicle data to be collected, based on the collection setting, acquires the set collected data from each ECU, and outputs the acquired collected data; a multi-stage holding unit 53 that holds collected data output before the collection condition is satisfied and collected data output after the collection condition is satisfied based on the collection setting; a transmission standby unit 60 that keeps the collected data held in the multi-stage holding unit 53 in a standby state for transmission to a request source; and a transmission unit 31 that transmits the collected data kept in the standby state by transmission standby unit 60 to the request source. The collection request includes a set value related to the number of pieces of collected data held in a multi-stage holding unit 53. The setting unit 40 determines the collection setting by changing the number of pieces of collected data held in the multi-stage holding unit 53 from the set value.

As a result, the vehicle data collection device 5 according to the first embodiment can have a collected data accumulating function as the multi-stage holding unit 53 including a volatile memory, separately from the transmission standby unit 60 including a non-volatile memory. Therefore, the vehicle data collection device 5 according to the first embodiment does not need to frequently transmit collected data from the collected data output unit 52 to the transmission standby unit 60, and does not need to provide non-volatile memories for all ECUs that can be sources from which the collected data is output. In addition, the vehicle data collection device 5 according to the first embodiment can change the number of pieces of collected data held in the multi-stage holding unit 53 from the set value included in the collection request according to each ECU. Therefore, the vehicle data collection device 5 according to the first embodiment can accumulate collected data before and after the collection condition is satisfied according to the capacity of the memory constituting the multi-stage holding unit 53. Therefore, even in a case where specifications of a plurality of vehicles selected according to the range included in the administrator setting are different, the vehicle data collection device 5 according to the first embodiment can collect vehicle data before and after the collection condition is satisfied while suppressing communication constraints and cost increases. Therefore, the vehicle data collection device 5 can flexibly collect vehicle data before and after the collection condition is satisfied while suppressing communication constraints and cost increases.

Further, in the vehicle data collection device 5 according to the first embodiment, the multi-stage holding unit 53 updates the held data, which is the collected data held in the multi-stage holding unit 53, at every predetermined operation cycle by deleting the held collected data from the oldest one in chronological order and sequentially holding the collected data Output from the collected data output unit 52 at the every operation cycle. When a predetermined number of operation cycles have elapsed after the collection condition is satisfied, the multi-stage holding unit 53 stops updating the held data and transmits the held data to the transmission standby unit 60. The transmission standby unit 60 stores the held data transmitted from the multi-stage holding unit 53 and keeps the transmitted held data in the standby state until communication with the request source is established. When the communication with the request source is established, the transmission unit 31 transmits the standby data of the transmission standby unit 60, which is the held data stored in the transmission standby unit 60, to the request source.

As a result, in the vehicle data collection device 5 according to the first embodiment, the multi-stage holding unit 53 can be configured using the existing volatile memory and program, thereby further suppressing cost increases. In addition, the vehicle data collection device 5 according to the first embodiment can suppress the occurrence of communication errors with the request source, thereby further suppressing the occurrence of communication constraints. Therefore, the vehicle data collection device 5 according to the first embodiment can further suppress the occurrence of communication constraints and cost increases, and can flexibly and easily collect vehicle data before and after the collection condition is satisfied.

Further, in the vehicle data collection device 5 according to the first embodiment, the collection request includes a first set value related to the number of pieces of collected data output before the collection condition is satisfied and held in the multi-stage holding unit 53, and a second set value related to the number of pieces of collected data output after the collection condition is satisfied and held in the multi-stage holding unit 53. The setting unit 40 determines the collection setting by changing the number of pieces of collected data held in the multi-stage holding unit 53 from the first set value and the second set value.

As a result, the vehicle data collection device 5 according to the first embodiment can flexibly and easily change the number of pieces of collected data output before the collection condition is satisfied and held in the multi-stage holding unit 53 and the number of pieces of collected data output after the collection condition is satisfied and held in the multi-stage holding unit 53. Therefore, the vehicle data collection device 5 according to the first embodiment can more flexibly and easily collect vehicle data before and after the collection condition is satisfied while suppressing communication constraints and cost increases.

Note that the vehicle data collection device 5 according to the first embodiment may be initially set to collect vehicle data that assists the use of an event data recorder (EDR) or a drive recorder, such as an inter-vehicle distance from a preceding vehicle, before the setting unit 40 determines a collection setting. As a result, the vehicle data collection device 5 according to the first embodiment can effectively utilize the function of the vehicle data collection device 5 even before the collection setting is determined.

Second Embodiment

A vehicle data collection device 5 according to a second embodiment will be described with reference to FIG. 16. In the vehicle data collection device 5 according to the second embodiment, the description of the configurations and operations similar to those of the first embodiment will be omitted.

Figure 16:
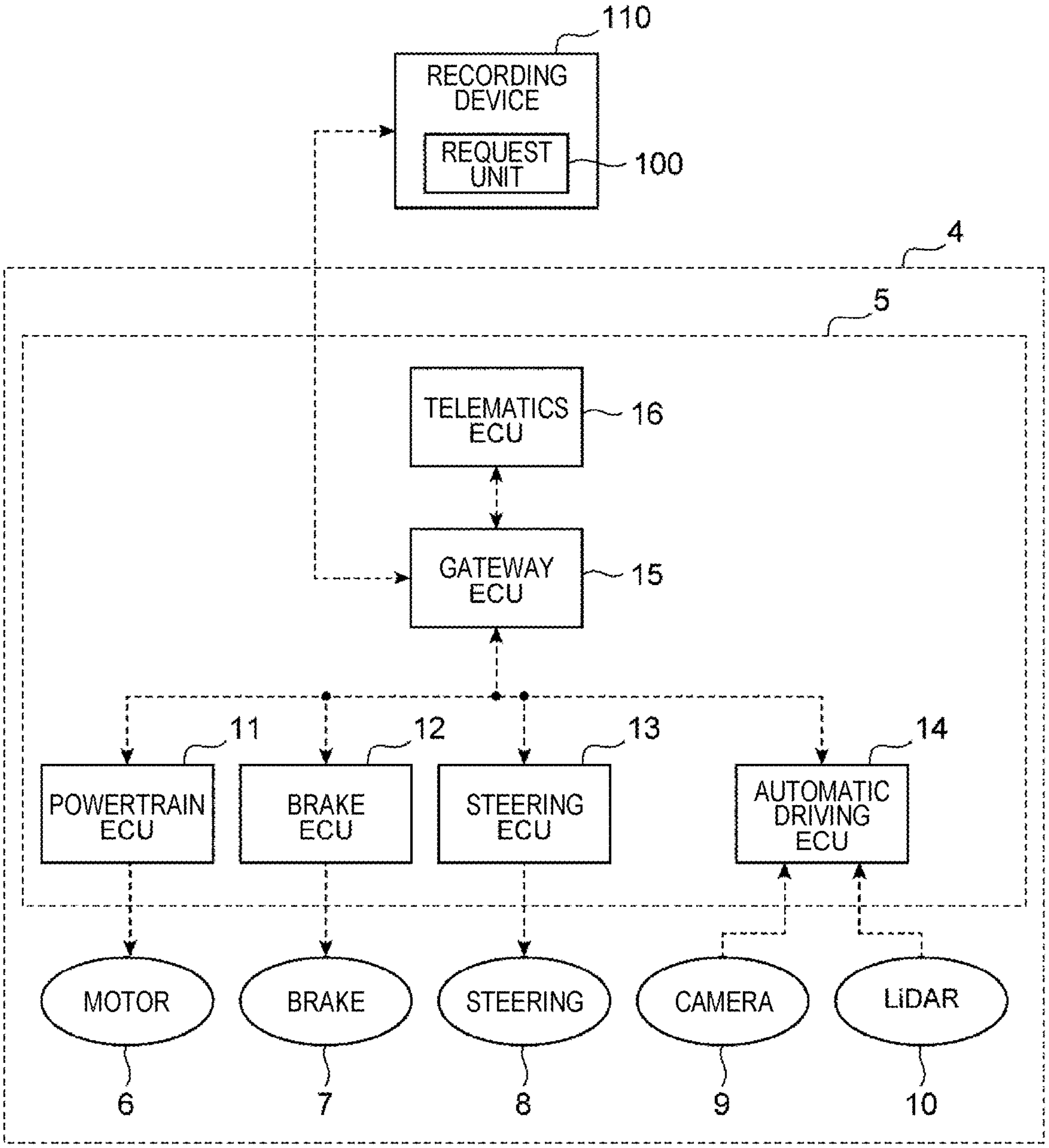
FIG. 16 is a diagram illustrating a schematic configuration of a vehicle data collection device according to a second embodiment.

FIG. 16 is a diagram illustrating a schematic configuration of the vehicle data collection device 5 according to the second embodiment. A broken line arrow illustrated in FIG. 16 indicates a flow of a signal or data.

In the vehicle data collection device 5 according to the second embodiment, the source from which collection of vehicle data is requested is a recording device 110 connected to the vehicle 4. That is, in the vehicle data collection system 1 according to the second embodiment, the request unit 100 is provided in the recording device 110, not in the server device 3.

The recording device 110 is connected to the gateway ECU 15 in a wired manner. The recording device 110 includes a CPU, a DRAM, a flash memory, and the like, and the CPU executes a recording device control program to implement the function of the request unit 100.

In the vehicle data collection device 5 according to the second embodiment, a vehicle data collection request transmitted from the recording device 110 is received by the reception unit 30 of the communication function 20 implemented by the gateway ECU 15, and is transmitted to the setting unit 40 of the setting function 21 implemented by the gateway ECU 15. Then, in the vehicle data collection device 5 according to the second embodiment, the determination function 22 implemented by the automatic driving ECU 14 sets determination data and a collection condition based on the collection setting, and the collection function 23 implemented by the automatic driving ECU 14 sets and holds collected data based on the collection setting. Then, in the vehicle data collection device 5 according to the second embodiment, the transmission standby unit 60 of the standby function 24 implemented by the automatic driving ECU 14 keep the held collected data in a standby state. Then, in the vehicle data collection device 5 according to the second embodiment, the transmission unit 31 of the communication function 20 implemented by the gateway ECU 15 transmits the collected data kept in the standby state by the transmission standby unit 60 to the recording device 110.

As a result, the vehicle data collection device 5 according to the second embodiment can collect vehicle data by the recording device 110, even in a case where the vehicle 4 does not communicate with the server device 3 or even in a case where communication between the vehicle 4 and the server device 3 is not established. Therefore, even in a case where the vehicle 4 does not communicate with the server device 3 or in a case where communication between the vehicle 4 and the server device 3 is not established, the vehicle data collection device 5 according to the second embodiment can flexibly collect vehicle data before and after a collection condition is satisfied while suppressing communication constraints and cost increases.

Third Embodiment

A vehicle data collection device 5 according to a third embodiment will be described with reference to FIG. 17. In the vehicle data collection device 5 according to the third embodiment, the description of the configurations and operations similar to those of the first embodiment will be omitted.

Figure 17:
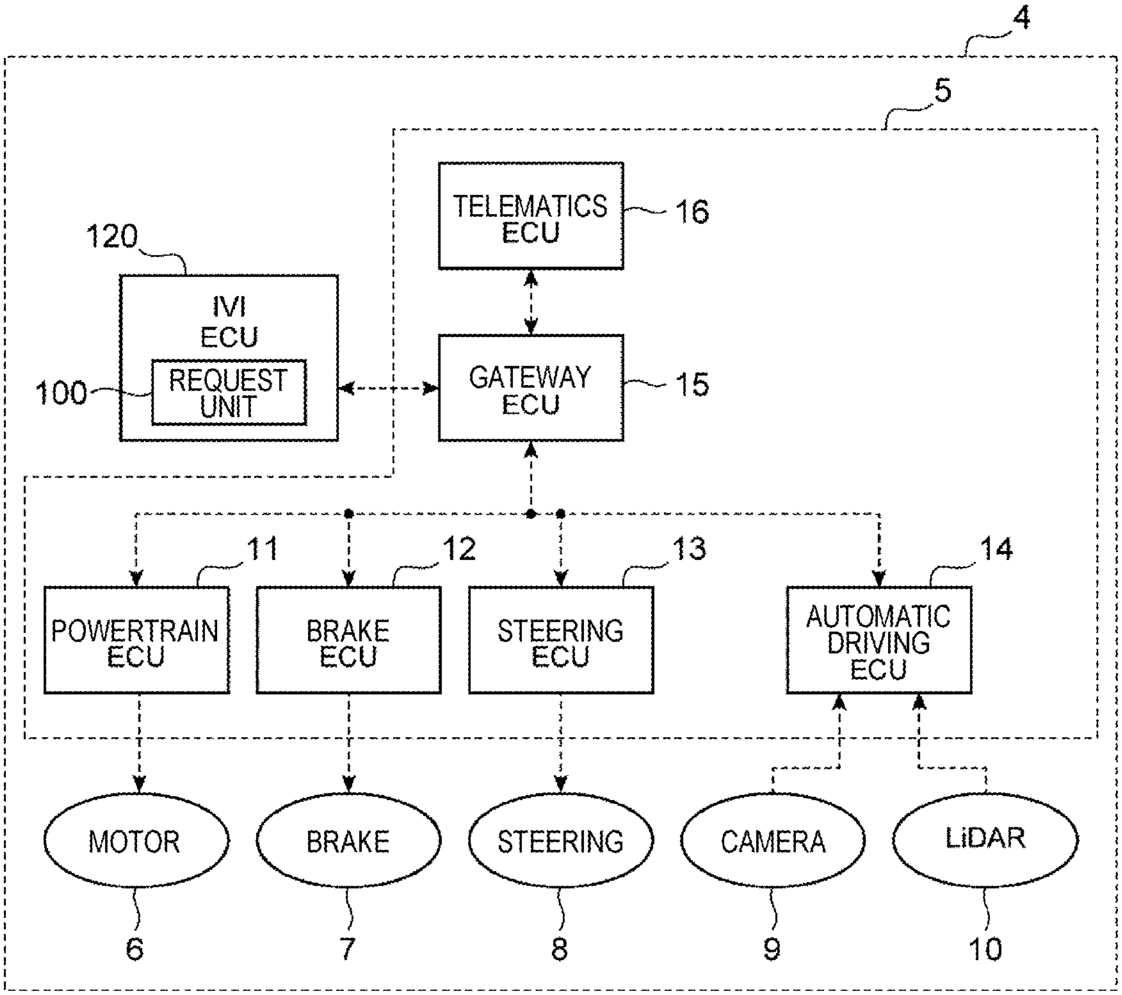
FIG. 17 is a diagram illustrating a schematic configuration of a vehicle data collection device according to a third embodiment.

FIG. 17 is a diagram illustrating a schematic configuration of the vehicle data collection device 5 according to the third embodiment. A broken line arrow illustrated in FIG. 17 indicates a flow of a signal or data.

In the vehicle data collection device 5 according to the third embodiment, the source from which collection of vehicle data is requested is an in-vehicle infotainment (IVI) ECU 120 which is an ECU mounted on a vehicle. That is, in the vehicle data collection system 1 according to the third embodiment, the request unit 100 is provided in the IVIECU 120, not in the server device 3.

The IVIECU 120 is connected to the gateway ECU 15 in a wired manner. The recording device 110 includes a CPU, a DRAM, a flash memory, and the like, and the CPU executes an IVI control program to implement the function of the request unit 100.

In the vehicle data collection device 5 according to the third embodiment, a vehicle data collection request transmitted from the IVIECU 120 is received by the reception unit 30 of the communication function 20 implemented by the gateway ECU 15, and is transmitted to the setting unit 40 of the setting function 21 implemented by the gateway ECU 15. Then, in the vehicle data collection device 5 according to the third embodiment, the determination function 22 implemented by the automatic driving ECU 14 sets determination data and a collection condition based on the collection setting, and the collection function 23 implemented by the automatic driving ECU 14 sets and holds collected data based on the collection setting. Then, in the vehicle data collection device 5 according to the third embodiment, the transmission standby unit 60 of the standby function 24 implemented by the automatic driving ECU 14 keep the held collected data in a standby state. Then, in the vehicle data collection device 5 according to the third embodiment, the transmission unit 31 of the communication function 20 implemented by the gateway ECU 15 transmits the collected data kept in the standby state by the transmission standby unit 60 to the IVIECU 120.

As a result, the vehicle data collection device 5 according to the third embodiment can collect vehicle data by another ECU mounted on the vehicle 4, even if a new device is not provided outside the vehicle 4. Therefore, even if a new device is not provided outside the vehicle 4, the vehicle data collection device 5 according to the third embodiment can flexibly collect vehicle data before and after the collection condition is satisfied while suppressing communication constraints and cost increases.

Fourth Embodiment

A vehicle data collection device 5 according to a fourth embodiment will be described with reference to FIGS. 18 and 19. In the vehicle data collection device 5 according to the fourth embodiment, the description of the configurations and operations similar to those of the first embodiment will be omitted.

Figure 18:
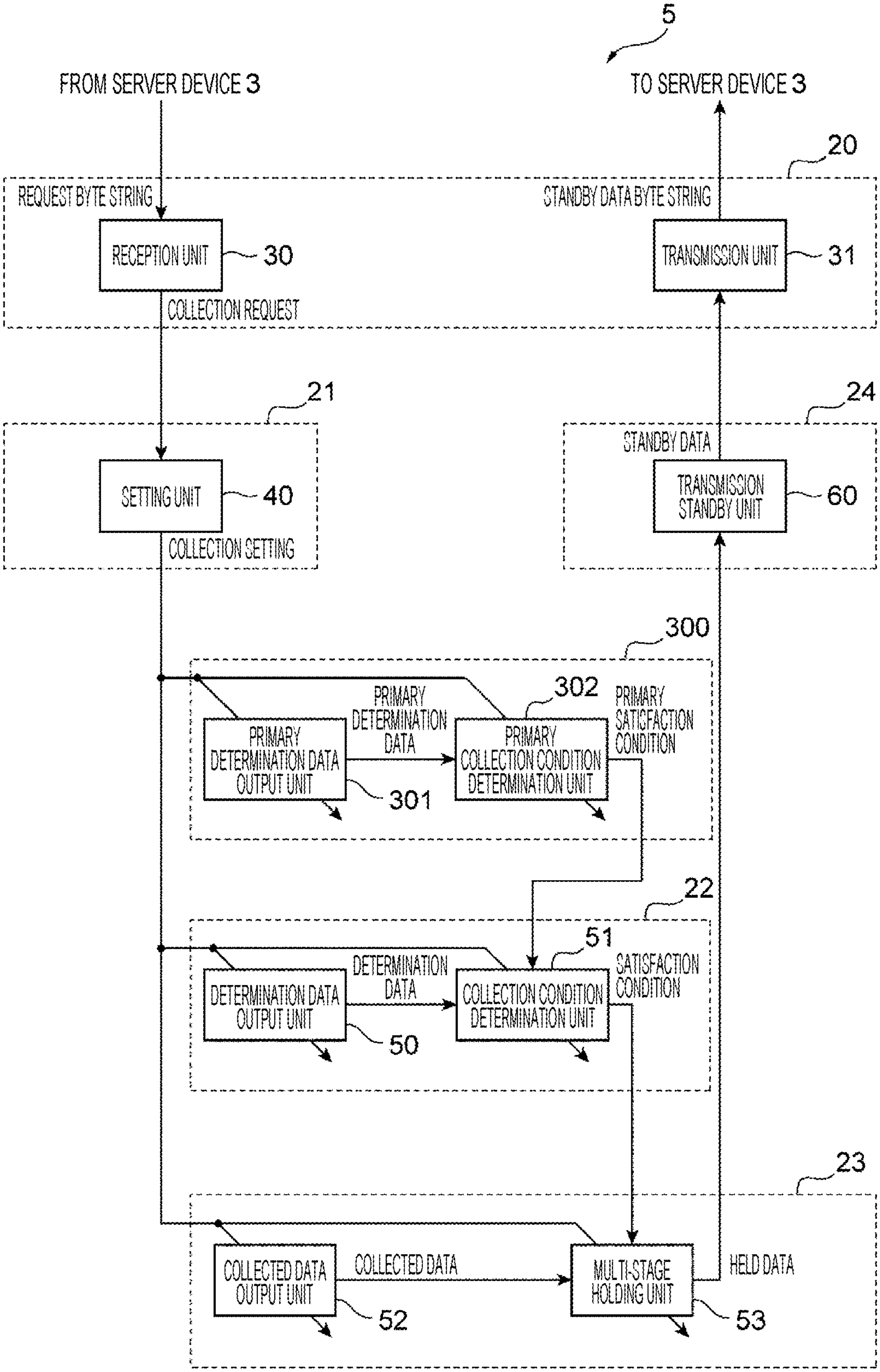
FIG. 18 is a diagram illustrating a functional configuration of a vehicle data collection device according to a fourth embodiment.

FIG. 18 is a diagram illustrating a functional configuration of the vehicle data collection device 5 according to the fourth embodiment.

The vehicle data collection device 5 according to the fourth embodiment further includes a primary determination function 300 that determines whether a primary vehicle data collection condition is satisfied prior to the determination function 22.

The primary determination function 300 is implemented by the power train ECU 11, the brake ECU 12, the steering ECU 13, the automatic driving ECU 14, or the gateway ECU 15. The primary determination function 300 is constituted by the CPU, the memory, and the primary determination program included in the power train ECU 11, the brake ECU 12, the steering ECU 13, the automatic driving ECU 14, or the gateway ECU 15.

The primary determination function 300 includes a primary collection condition determination unit 302 that sets a primary vehicle data collection condition based on the collection setting determined by the setting unit 40 and determines whether the set primary collection condition is satisfied prior to the determination of the collection condition determination unit 51. Further, the primary determination function 300 includes a primary determination data output unit 301 that sets vehicle data to be determined when the primary collection condition determination unit 302 determines whether the primary collection condition is satisfied as primary determination data based on the collection setting, and acquires the set primary determination data from the ECU and outputs the primary determination data.

The primary collection condition determination unit 302 determines whether the primary determination data output by the primary determination data output unit 301 satisfies the set primary collection condition. When it is determined that the primary collection condition is satisfied, the primary collection condition determination unit 302 transmits a primary satisfaction condition indicating the satisfied primary collection condition to the collection condition determination unit 51. Upon receiving the primary satisfaction condition, the collection condition determination unit 51 starts determining whether the collection condition is satisfied.

Figure 19:
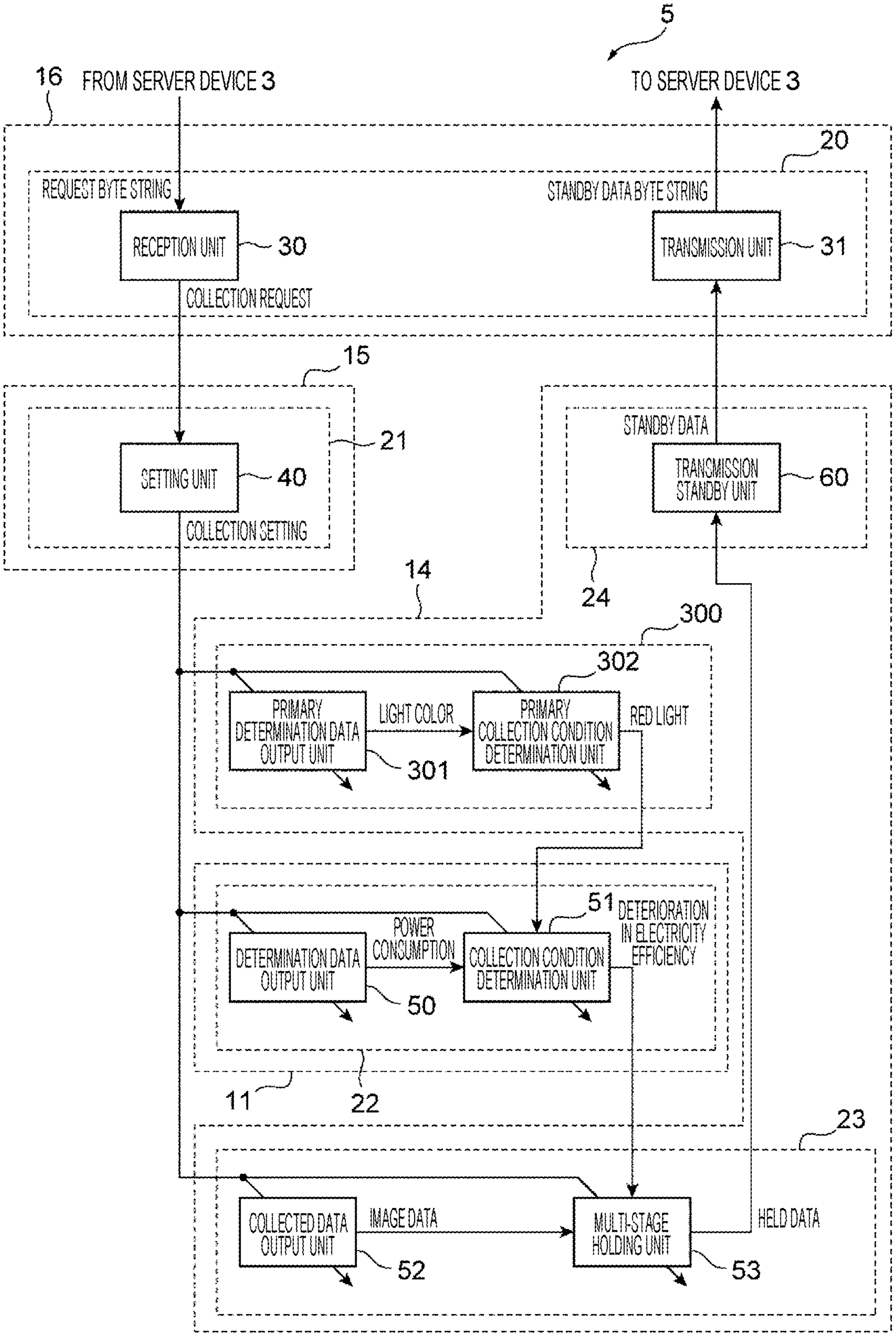
FIG. 19 is a diagram illustrating an example of an operation of the vehicle data collection device illustrated in FIG. 18.

FIG. 19 is a diagram illustrating an example of an operation of the vehicle data collection device 5 illustrated in FIG. 18. FIG. 19 illustrates an example of a case where image data received from the camera 9 is collected when a deterioration in electricity efficiency occurs at a red light in order to improve efficiency of automatic driving.

The primary determination data output unit 301 implemented by the automatic driving ECU 14 sets a light color as primary determination data. The primary collection condition determination unit 302 implemented by the automatic driving ECU 14 sets a primary collection condition to determine that the light is a red light when the light color becomes red. The determination data output unit 50 implemented by the powertrain ECU 11 sets a power consumption of the motor 6 as determination data. The collection condition determination unit 51 implemented by the power train ECU 11 sets a collection condition to determine that a deterioration in electricity efficiency has occurred when the power consumption of the motor 6 becomes equal to or greater than a predetermined value, and sets a collection condition to start determining the power consumption when a red light is received as primary satisfaction condition. The collected data output unit 52 implemented by the automatic driving ECU 14 sets image data received from the camera 9 as collected data. As a result, the vehicle data collection device 5 illustrated in FIG. 19 can collect image data when a deterioration in electricity efficiency occurs at a red light.

In this manner, the vehicle data collection device 5 according to the fourth embodiment further includes a primary determination function 300 that determines whether a primary vehicle data collection condition is satisfied prior to the determination function 22. As a result, the vehicle data collection device 5 according to the fourth embodiment can reliably determine whether the collection condition is satisfied without transmitting and receiving determination data itself between the ECUs even in a case where the determination data necessary for determining whether the collection condition is satisfied straddles a plurality of ECUs. Therefore, the vehicle data collection device 5 according to the fourth embodiment can flexibly and reliably collect vehicle data before and after the collection condition is satisfied while suppressing communication constraints and cost increases.

Fifth Embodiment

A vehicle data collection device 5 according to a fifth embodiment will be described with reference to FIG. 20. In the vehicle data collection device 5 according to the fifth embodiment, the description of the configurations and operations similar to those of the first embodiment will be omitted.

Figure 20:
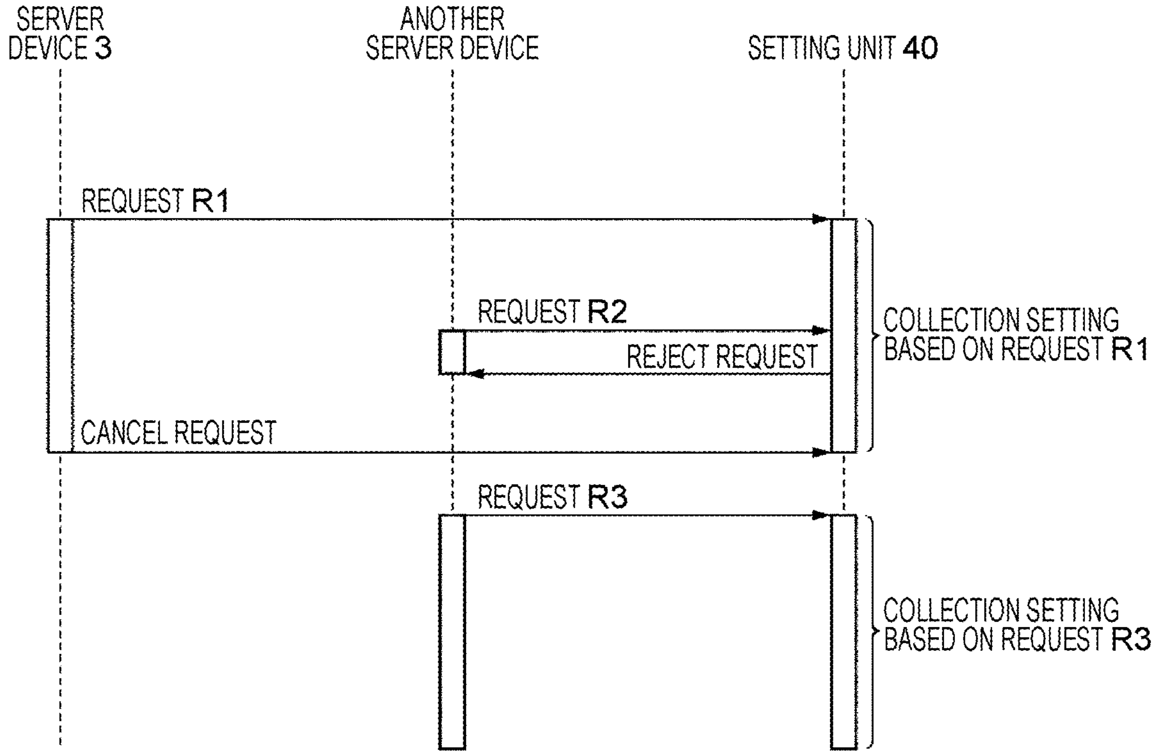
FIG. 20 is a timing chart for explaining a vehicle data collection device according to a fifth embodiment.

FIG. 20 is a timing chart for explaining the vehicle data collection device 5 according to the fifth embodiment.

While vehicle data is being received from the server device 3 based on a collection request R1, even if a new collection request R2 is received from another server device, the vehicle data collection device 5 according to the fifth embodiment rejects the collection request R2 without responding to the new collection request R2. Then, when receiving a new collection request R3 after receiving the cancellation of the collection request R1, the vehicle data collection device 5 according to the fifth embodiment starts collecting vehicle data based on the collection request R3. That is, the setting unit 40 of the vehicle data collection device 5 according to the fifth embodiment determines a new collection setting to collect vehicle data according to the new collection request R3 after the cancellation of the collection request R1 is notified from the request source.

As a result, the vehicle data collection device 5 according to the fifth embodiment can prevent the collection setting from being overwritten without the knowledge of the administrator. Therefore, the vehicle data collection device 5 according to the fifth embodiment can flexibly and reliably collect vehicle data before and after the collection condition is satisfied while suppressing communication constraints and cost increases.

Sixth Embodiment

A vehicle data collection device 5 according to a sixth embodiment will be described with reference to FIG. 21. In the vehicle data collection device 5 according to the sixth embodiment, the description of the configurations and operations similar to those of the first embodiment will be omitted.

Figure 21:
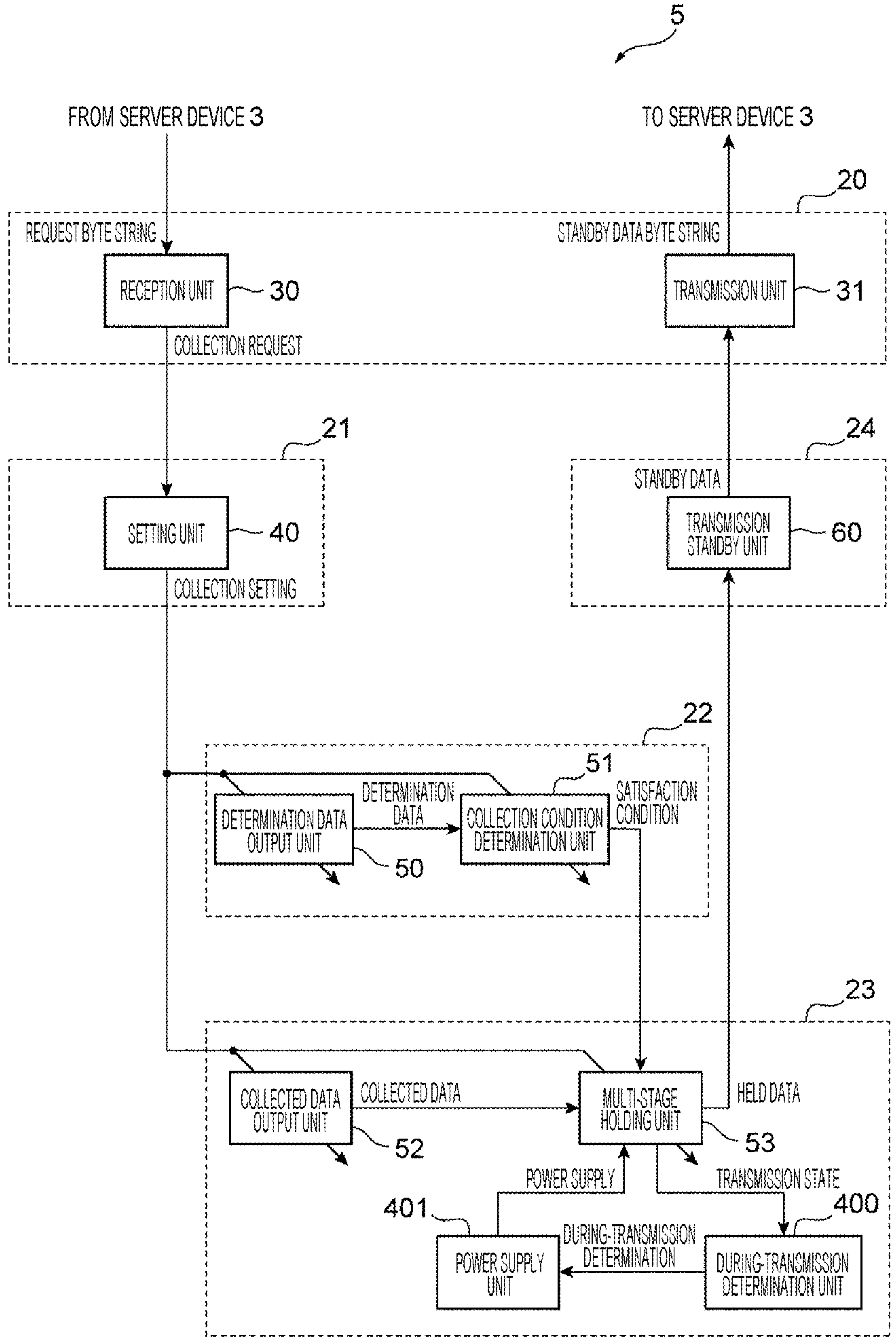
FIG. 21 is a diagram illustrating a functional configuration of a vehicle data collection device according to a sixth embodiment.

FIG. 21 is a diagram illustrating a functional configuration of the vehicle data collection device 5 according to the sixth embodiment.

In the vehicle data collection device 5 according to the sixth embodiment, the collection function 23 further includes a during-transmission determination unit 400 and a power supply unit 401 in addition to the collected data output unit 52 and the multi-stage holding unit 53. The during-transmission determination unit 400 determines whether the collected data held in the multi-stage holding unit 53 (held data) is being transmitted to the transmission standby unit 60, and transmits a determination result to the power supply unit 401. The power supply unit 401 supplies power to the memory constituting the multi-stage holding unit 53. Upon receiving the determination result indicating that the collected data held in the multi-stage holding unit 53 is being transmitted to the transmission standby unit 60 (hereinafter, also referred to as "during-transmission determination") from the during-transmission determination unit 400, the power supply unit 401 continues the power supply to the memory constituting the multi-stage holding unit 53.

As a result, even if the power supply of the vehicle 4 is turned off before the transmission of the collected data held in the multi-stage holding unit 53 including the volatile memory is completed, the vehicle data collection device 5 according to the sixth embodiment can prevent the power supply to the multi-stage holding unit 53 from being cut off and the collected data from being lost. Therefore, the vehicle data collection device 5 according to the sixth embodiment can flexibly and reliably collect vehicle data before and after the collection condition is satisfied while suppressing communication constraints and cost increases.

Seventh Embodiment

A vehicle data collection device 5 according to a seventh embodiment will be described with reference to FIG. 22. In the vehicle data collection device 5 according to the seventh embodiment, the description of the configurations and operations similar to those of the first embodiment will be omitted.

Figure 22:
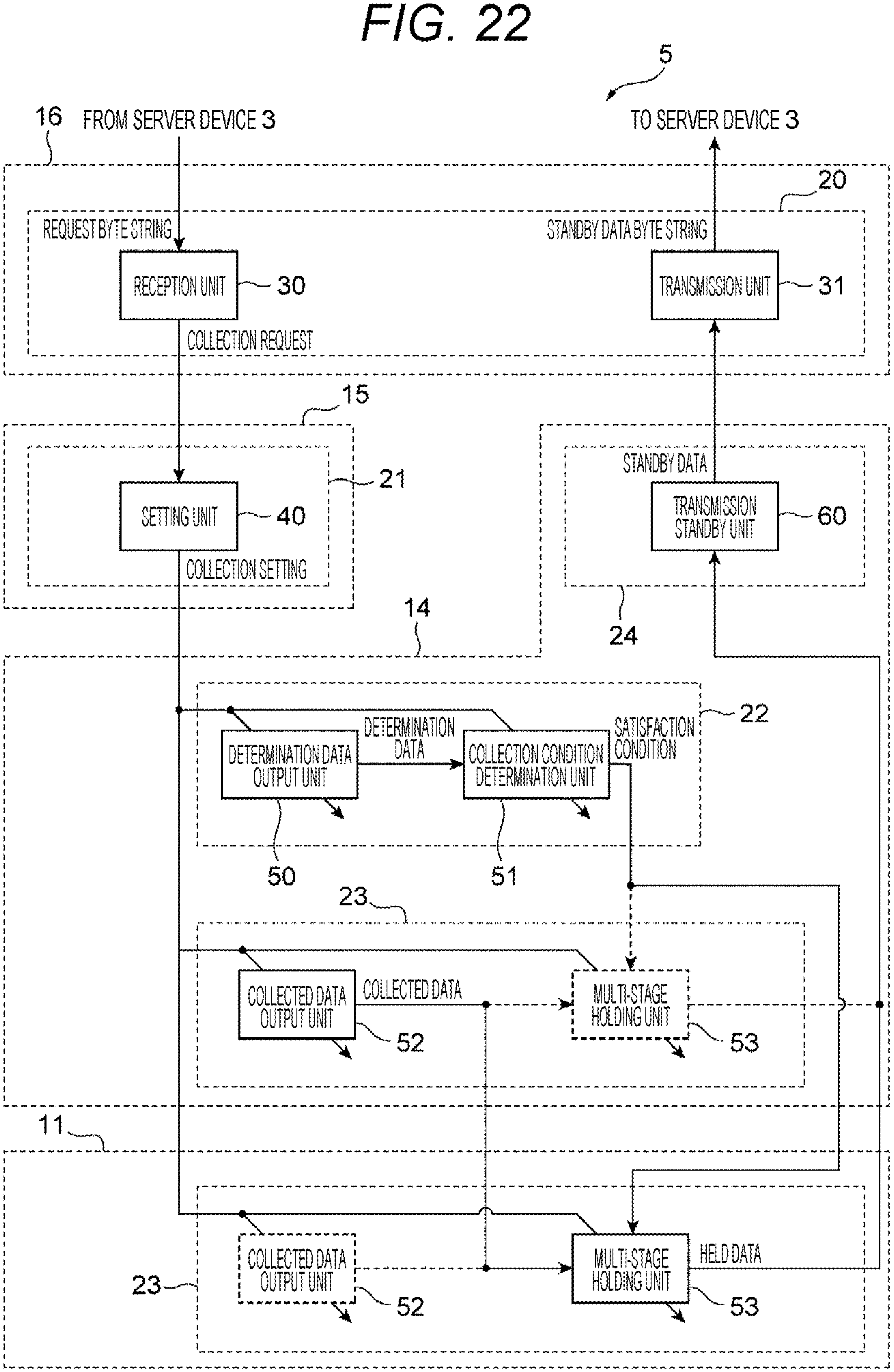
FIG. 22 is a diagram illustrating a functional configuration of a vehicle data collection device according to a seventh embodiment.

FIG. 22 is a diagram illustrating a functional configuration of the vehicle data collection device 5 according to the seventh embodiment.

The vehicle data collection device 5 according to the seventh embodiment further includes another multi-stage holding unit different from the multi-stage holding unit 53. When the capacity of the memory constituting the multi-stage holding unit 53 is insufficient, the collected data output unit 52 according to the seventh embodiment transmits collected data to another multi-stage holding unit.

For example, FIG. 22 illustrates an example of a case where the collection function 23 is implemented by the automatic driving ECU 14 and the power train ECU 11, and the capacity of the memory constituting the multi-stage holding unit 53 implemented by the automatic driving ECU 14 is insufficient with respect to the capacity necessary for executing the collection request. In this case, in the vehicle data collection device 5 according to the seventh embodiment, the collected data output unit 52 implemented by the automatic driving ECU 14 can transmit collected data to the multi-stage holding unit 53 implemented by the power train ECU 11.

As a result, the vehicle data collection device 5 according to the seventh embodiment can reliably hold and collect vehicle data even when the capacity of the memory constituting the multi-stage holding unit 53 is insufficient. Therefore, the vehicle data collection device 5 according to the seventh embodiment can flexibly and reliably collect vehicle data before and after the collection condition is satisfied while suppressing communication constraints and cost increases.

Eighth Embodiment

A vehicle data collection device 5 according to an eighth embodiment will be described with reference to FIG. 23. In the vehicle data collection device 5 according to the eighth embodiment, the description of the configurations and operations similar to those of the first embodiment will be omitted.

Figure 23:
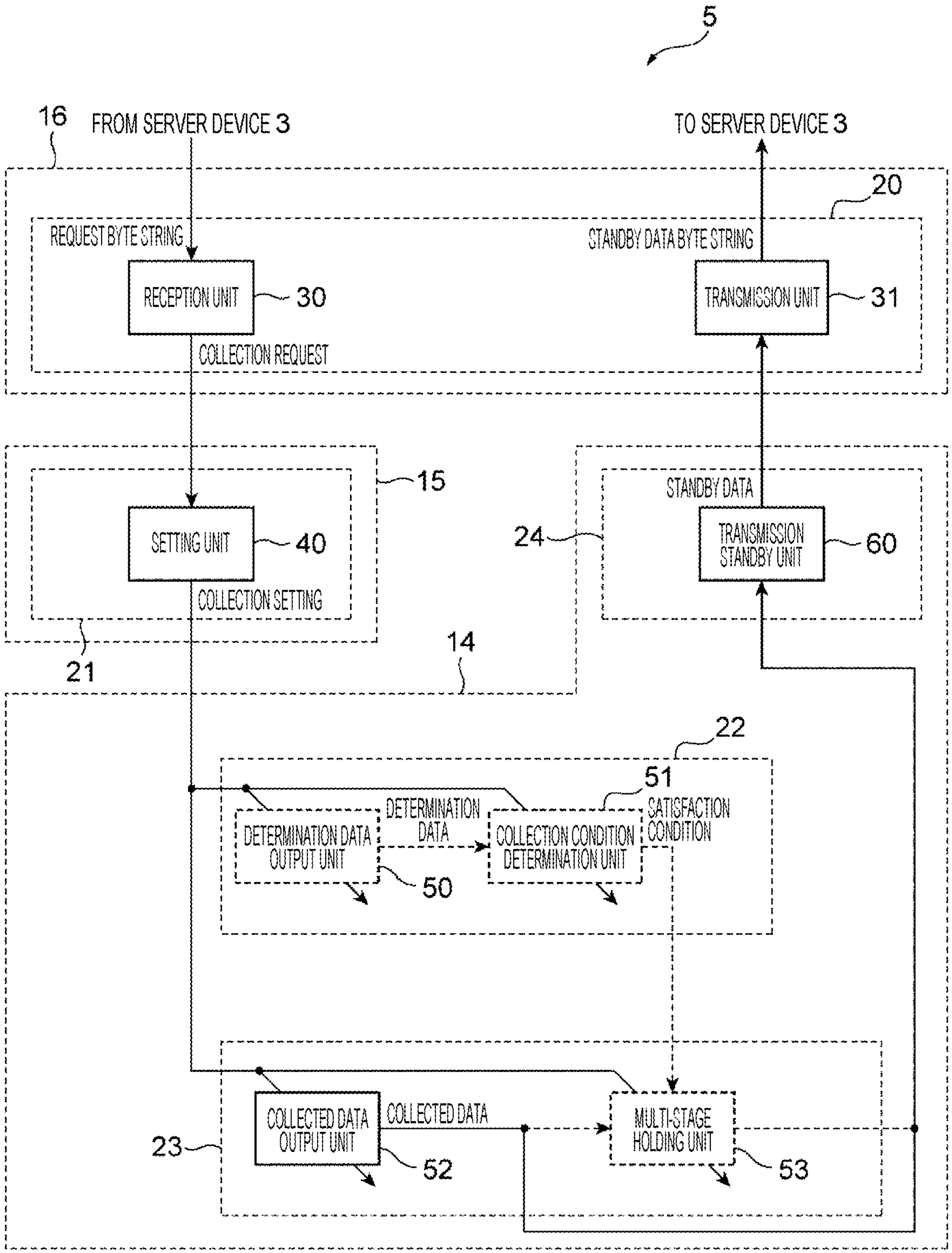
FIG. 23 is a diagram illustrating a functional configuration of a vehicle data collection device according to an eighth embodiment.

FIG. 23 is a diagram illustrating a functional configuration of the vehicle data collection device 5 according to the eighth embodiment.

In the vehicle data collection device 5 according to the eighth embodiment, when the capacity of the memory constituting the multi-stage holding unit 53 is insufficient, the collected data output unit 52 transmits collected data to the transmission standby unit 60.

For example, FIG. 23 illustrates an example of a case where the collection function 23 is implemented by the automatic driving ECU 14, and the capacity of the memory constituting the multi-stage holding unit 53 implemented by the automatic driving ECU 14 is insufficient with respect to the capacity necessary for executing the collection request. In this case, in the vehicle data collection device 5 according to the eighth embodiment, the collected data output unit 52 implemented by the automatic driving ECU 14 can transmit collected data to the transmission standby unit 60.

As a result, the vehicle data collection device 5 according to the eighth embodiment can reliably transmit vehicle data to the transmission standby unit 60 and collect the vehicle data even when the capacity of the memory constituting the multi-stage holding unit 53 is insufficient. Therefore, the vehicle data collection device 5 according to the seventh embodiment can flexibly and reliably collect vehicle data before and after the collection condition is satisfied while suppressing communication constraints and cost increases.

Ninth Embodiment

A vehicle data collection system 1 according to a ninth embodiment will be described with reference to FIGS. 24 and 25. In the vehicle data collection system 1 according to the ninth embodiment, the description of the configurations and operations similar to those of the first embodiment will be omitted.

Figure 24:
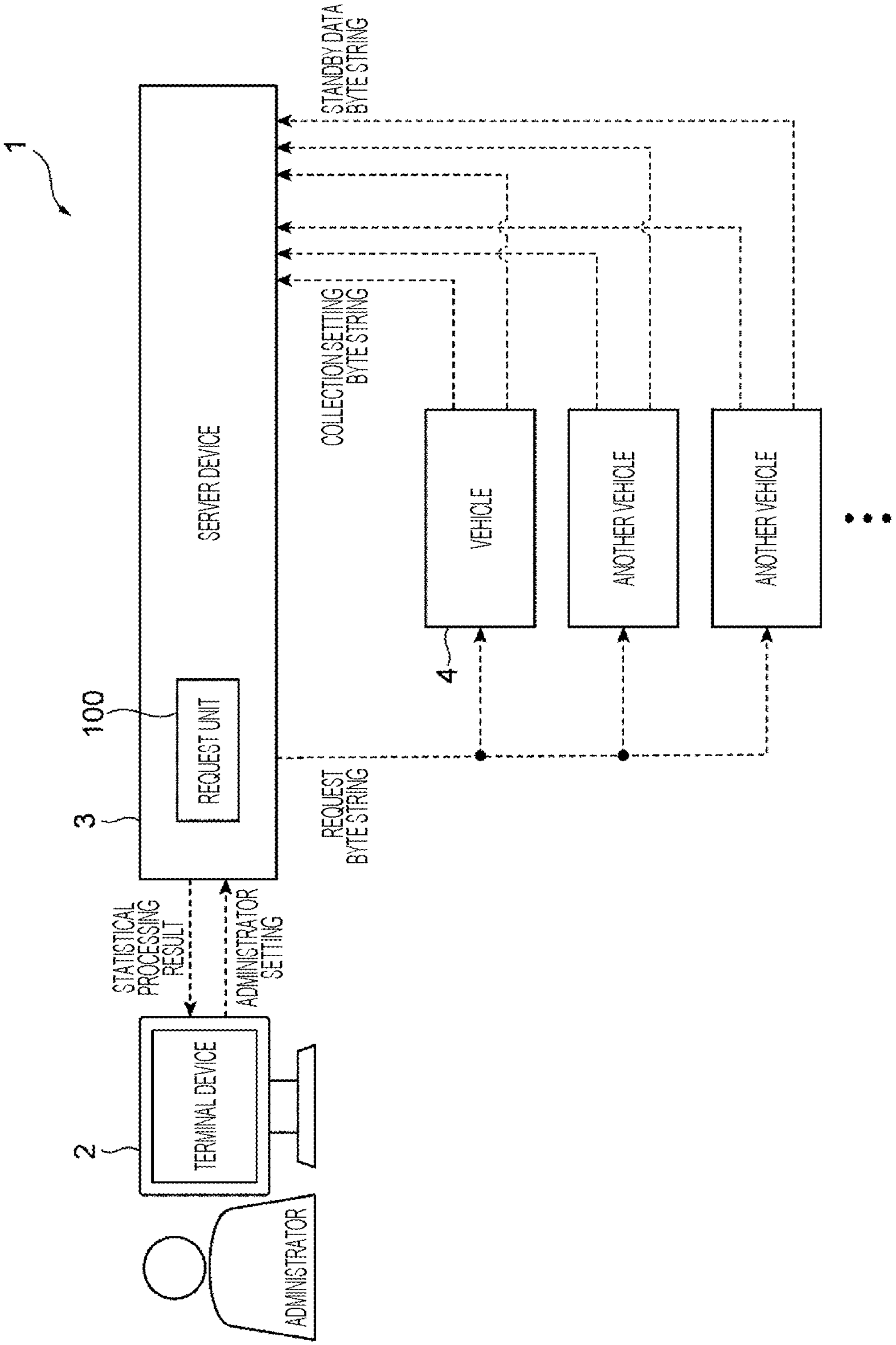
FIG. 24 is a diagram illustrating a schematic configuration of a vehicle data collection system according to a ninth embodiment.

FIG. 24 is a diagram illustrating a schematic configuration of the vehicle data collection system 1 according to the ninth embodiment. A broken line arrow illustrated in FIG. 24 indicates a flow of a signal or data.

The vehicle data collection device 5 according to the ninth embodiment calculates a collection setting byte string by serializing the collection setting determined by the setting unit 40, and transmits the collection setting byte string to the server device 3 via the mobile phone communication network. The server device 3 deserializes a plurality of collection setting byte strings received from a plurality of vehicles including the vehicle 4 to restore a plurality of collection settings. Then, the server device 3 performs statistical processing on the plurality of collection settings, and transmits a statistical processing result to the terminal device 2. The terminal device 2 visualizes the statistical processing result transmitted from the server device 3, and displays the statistical processing result on a display of the terminal device 2.

Figure 25:
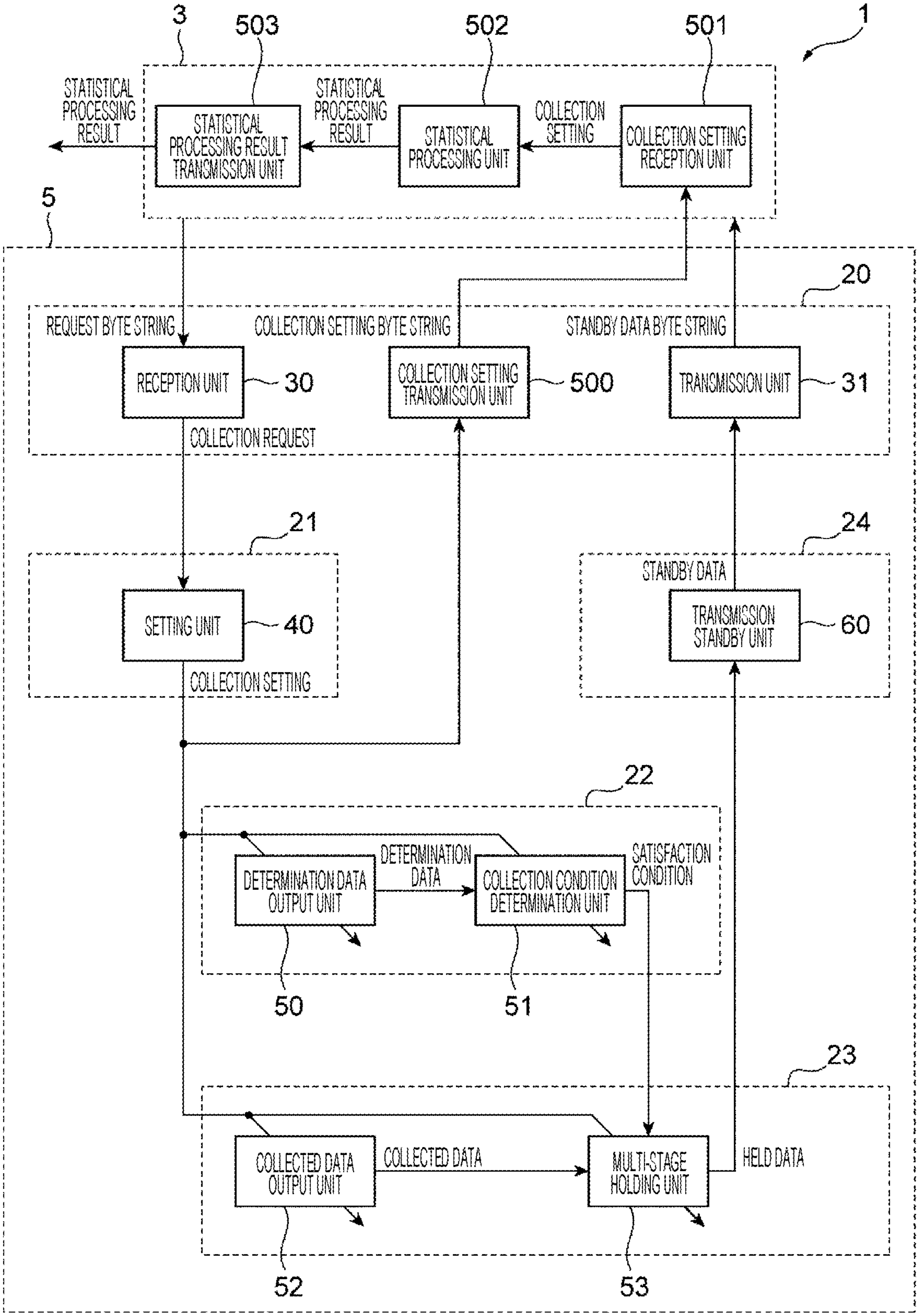
FIG. 25 is a diagram illustrating a functional configuration of the vehicle data collection system illustrated in FIG. 24.

FIG. 25 is a diagram illustrating a functional configuration of the vehicle data collection system 1 illustrated in FIG. 24.

The vehicle data collection device 5 according to the ninth embodiment further includes a collection setting transmission unit 500 that transmits the collection setting determined by the setting unit 40 to the server device 3 as the communication function 20. The server device 3 according to the ninth embodiment further includes a collection setting reception unit 501 that receives a plurality of collection settings transmitted from the vehicle data collection devices 5 mounted on the plurality of vehicles, a statistical processing unit 502 that performs statistical processing on the plurality of collection settings, and a statistical processing result transmission unit 503 that transmits a statistical processing result of the statistical processing unit 502 to the terminal device 2.

As a result, the vehicle data collection system 1 according to the ninth embodiment, even if the vehicle data collection devices 5 determines collection settings by changing the contents of the collection requests to execute the collection programs of the collection functions 23, the administrator can be aware of the plurality of collection settings of which the contents have been changed in the plurality of vehicles including vehicle 4 in advance before the collection of vehicle data is completed. Therefore, the vehicle data collection system 1 according to the ninth embodiment can improve user convenience as well as flexibly collecting vehicle data before and after the collection condition is satisfied while suppressing communication constraints and cost increases.

It should be noted that the present invention is not limited to the above-described embodiments, and includes various modifications. For example, the above-described embodiments have been described in detail in order to explain the present invention in an easy-to-understand manner, and are not necessarily limited to having all the configurations described above. Further, a part of the configuration of one embodiment may be replaced with the configuration of another embodiment, and the configuration of one embodiment may be added to the configuration of another embodiment. Further, with respect to a part of the configuration of each embodiment, it is possible to perform addition of another configuration, deletion, or replacement with another configuration.

Further, each of the above-described configurations, functions, processing units, processing means, and the like may be partially or entirely realized by hardware, for example, by designing an integrated circuit. Further, each of the above-described configurations, functions, and the like may be realized by software by a processor interpreting and executing a program realizing each of the functions. Information such as programs, tables, and files for implementing the respective functions can be stored in a recording device such as a memory, a hard disk, or a solid state drive (SSD), or a recording medium such as an IC card, an SD card, or a DVD.

In addition, control lines and information lines which are considered to be necessary for the explanation are illustrated, and all of the control lines and the information lines are not necessarily illustrated in products. Practically, it may be assumed that almost all components are connected to each other.

REFERENCE SIGNS LIST

1 vehicle data collection system
2 terminal device
3 server device
4 vehicle
5 vehicle data collection device
31 transmission unit
40 setting unit
50 determination data output unit
51 collection condition determination unit
52 collected data output unit
53 multi-stage holding unit
60 transmission standby unit
100 request unit
110 recording device
120 IVIECU
301 primary determination data output unit
302 primary collection condition determination unit
400 during-transmission determination unit
401 power supply unit
500 collection setting transmission unit
501 collection setting reception unit
502 statistical processing unit
503 statistical processing result transmission unit

The invention claimed is:

1. A vehicle data collection device that collects vehicle data from an electronic control device in response to a vehicle data collection request, the vehicle data collection device comprising:

a setting unit which determines a collection setting that is setting information for the electronic control device corresponding to the collection request;

a collection condition determination unit which sets a vehicle data collection condition based on the collection setting, and determines whether the set collection condition is satisfied;

a collected data output unit which sets collected data that is the vehicle data to be collected based on the collection setting, acquires the set collected data from the electronic control device, and outputs the acquired collected data;

a multi-stage holding unit which holds the collected data output before the collection condition is satisfied and the collected data output after the collection condition is satisfied based on the collection setting;

a transmission standby unit which keeps the collected data held in the multi-stage holding unit in a standby state for transmission to a collection request source; and a transmission unit which transmits the collected data kept in the standby state by the transmission standby unit to the request source, wherein the collection request includes a set value related to the number of pieces of collected data held in the multi-stage holding unit, and the setting unit determines the collection setting by changing the number of pieces of collected data held in the multi-stage holding unit from the set value.

2. The vehicle data collection device according to claim 1, wherein the multi-stage holding unit updates the held data, which is the collected data held in the multi-stage holding unit, at every predetermined operation cycle by deleting the held collected data from the oldest one in chronological order and sequentially holding the collected data output from the collected data output unit at the every operation cycle, when a predetermined number of operation cycles have elapsed after the collection condition is satisfied, the multi-stage holding unit stops updating the held data and transmits the held data to the transmission standby unit, the transmission standby unit stores the held data transmitted from the multi-stage holding unit and keeps the transmitted held data in the standby state until communication with the request source is established, and when the communication with the request source is established, the transmission unit transmits standby data of the transmission standby unit, which is the held data stored in the transmission standby unit, to the request source.

3. The vehicle data collection device according to claim 1, wherein the collection request includes a first set value related to the number of pieces of collected data output before the collection condition is satisfied and held in the multi-stage holding unit, and a second set value related to the number of pieces of collected data output after the collection condition is satisfied and held in the multi-stage holding unit, and the setting unit determines the collection setting by changing the number of pieces of collected data held in the multi-stage holding unit from the first set value and the second set value.

4. The vehicle data collection device according to claim 3, wherein the collection request includes a before-after priority for setting which one of the collected data output before the collection condition is satisfied and the collected data output after the collection condition is satisfied is preferentially held in the multi-stage holding unit, and the setting unit determines the collection setting to change the number of pieces of collected data held in the multi-stage holding unit by changing at least one of the first set value and the second set value based on a capacity of a memory constituting the multi-stage holding unit and the before-after priority.

5. The vehicle data collection device according to claim 3, wherein the collection condition determination unit determines whether each of a plurality of the collection conditions is satisfied, the collection request includes a condition priority for setting which one of the plurality of collection conditions is given priority in holding the collected data in the multi-stage holding unit, and the setting unit determines the collection setting to change the number of pieces of collected data held in the multi-stage holding unit by changing at least one of the first set value and the second set value based on a capacity of a memory constituting the multi-stage holding unit and the condition priority.

6. The vehicle data collection device according to claim 3, wherein the collection request includes a format priority for setting whether to give priority to maintenance of a format in which the collected data set by the first set value and the second set value is held in the multi-stage holding unit, and the setting unit determines the collection setting to change the number of pieces of collected data held in the multi-stage holding unit by changing at least one of the first set value and the second set value based on a capacity of a memory constituting the multi-stage holding unit and the format priority.

7. The vehicle data collection device according to claim 6, wherein the format priority includes a format maintenance priority for giving priority to the maintenance of the format in which the collected data set by the first set value and the second set value is held, and a format non-maintenance priority for giving no priority to the maintenance of the format in which the collected data set by the first set value and the second set value is held, and the setting unit determines the collection setting to exclude the collected data set by the first set value and the second set value from data to be collected when the format priority is the format maintenance priority and it is difficult to maintain the format in which the collected data set by the first set value and the second set value is held.

8. The vehicle data collection device according to claim 1, further comprising:

a primary collection condition determination unit which sets a primary collection condition for the vehicle data based on the collection setting, and determines whether the set primary collection condition is satisfied prior to the determination by the collection condition determination unit, wherein when the primary collection condition determination unit determines that the primary collection condition is satisfied, the collection condition determination unit starts determining whether the collection condition is satisfied.

9. The vehicle data collection device according to claim 1, wherein the setting unit determines a new collection setting to collect vehicle data in response to a new collection request after cancellation of the collection request is notified from the request source.

10. The vehicle data collection device according to claim 1, further comprising:

a during-transmission determination unit which determines whether the collected data held in the multi-stage holding unit is being transmitted to the transmission standby unit; and a power supply unit that supplies power to a memory constituting the multi-stage holding unit, wherein the power supply unit continues the power supply to the memory when it is determined that the collected data held in the multi-stage holding unit is being transmitted to the transmission standby unit.

11. The vehicle data collection device according to claim 1, wherein when a capacity of a memory constituting the multi-stage holding unit is insufficient, the collected data output unit transmits the collected data to another multi-stage holding unit different from the multi-stage holding unit.

12. The vehicle data collection device according to claim 1, wherein when a capacity of a memory constituting the multi-stage holding unit is insufficient, the collected data output unit transmits the collected data to the transmission standby unit.

13. The vehicle data collection device according to claim 1, wherein the request source is at least one of a server device provided outside a vehicle on which the electronic control device is mounted, a recording device connected to the vehicle, and another electronic control device mounted on the vehicle and different from the electronic control device.

14. A vehicle data collection system comprising: a server device which requests a vehicle to collect vehicle data; and a vehicle that collects the vehicle data from an electronic control device of the vehicle in response to the request from the server device, wherein the server device includes a request unit which generates a vehicle data collection request and transmits the generated collection request to the vehicle, the vehicle includes:

a setting unit which determines a collection setting that is setting information for the electronic control device corresponding to the collection request;

a collection condition determination unit which sets a vehicle data collection condition based on the collection setting, and determines whether the set collection condition is satisfied;

a collected data output unit which sets collected data that is the vehicle data to be collected based on the collection setting, acquires the set collected data from the electronic control device, and outputs the acquired collected data;

a multi-stage holding unit which holds the collected data output before the collection condition is satisfied and the collected data output after the collection condition is satisfied based on the collection setting;

a transmission standby unit which keeps the collected data held in the multi-stage holding unit in a standby state for transmission to a collection request source; and a transmission unit which transmits the collected data kept in the standby state by the transmission standby unit to the request source, the collection request includes a set value related to the number of pieces of collected data held in the multi-stage holding unit, and the setting unit determines the collection setting by changing the number of pieces of collected data held in the multi-stage holding unit from the set value.

15. The vehicle data collection system according to claim 14, further comprising:

a terminal device communicably connected to the server device, wherein the vehicle further includes a collection setting transmission unit which transmits the collection setting to the server device, the server device includes:

a collection setting reception unit which receives a plurality of the collection settings transmitted from a plurality of the vehicles;

a statistical processing unit which performs statistical processing on the plurality of collection settings; and a statistical processing result transmission unit which transmits a statistical processing result of the statistical processing unit to the terminal device, and the terminal device displays the statistical processing result transmitted from the server device.

* * * * *